United States Patent
Zhu et al.

(10) Patent No.: US 11,496,923 B2
(45) Date of Patent: Nov. 8, 2022

(54) DATA TRANSMISSION METHOD AND APPARATUS USED IN WIRELESS BACKHAUL NETWORK

(71) Applicant: HUAWEI TECHNOLOGIES CO., LTD., Guangdong (CN)

(72) Inventors: Yuanping Zhu, Shanghai (CN); Shitong Yuan, Chengdu (CN); Jing Liu, Shanghai (CN); Mingzeng Dai, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 28 days.

(21) Appl. No.: 17/226,638

(22) Filed: Apr. 9, 2021

(65) Prior Publication Data
US 2021/0266783 A1 Aug. 26, 2021

Related U.S. Application Data

(63) Continuation of application No. PCT/CN2019/110454, filed on Oct. 10, 2019.

(30) Foreign Application Priority Data

Oct. 11, 2018 (CN) .......................... 201811183943.7

(51) Int. Cl.
*H04W 28/02* (2009.01)
*H04L 47/17* (2022.01)
*H04W 72/12* (2009.01)

(52) U.S. Cl.
CPC ......... *H04W 28/0278* (2013.01); *H04L 47/17* (2013.01); *H04W 72/1263* (2013.01)

(58) Field of Classification Search
None
See application file for complete search history.

(56) References Cited

U.S. PATENT DOCUMENTS

| 2010/0120442 A1 | 5/2010 | Zhuang et al. |
| 2017/0078945 A1 | 3/2017 | Ma et al. |
| 2018/0049190 A1 | 2/2018 | Abedini et al. |
| 2021/0211939 A1* | 7/2021 | Teyeb ..................... H04L 47/12 |

FOREIGN PATENT DOCUMENTS

| CN | 101980565 A | 2/2011 |
| CN | 102136986 A | 7/2011 |

(Continued)

OTHER PUBLICATIONS

Ericsson, Uplink Scheduling in IAB Networks, 3GPP TSG-RAN WG2 Meeting #103b, R2-1814365, pp. 1-5 (Year: 2018).*
Lenovo, Motorola Mobility,Consideration on multi-hop network, 3GPP TSG-RAN WG2 NR AH1807 Meeting,Montreal, Canada, Jul. 2-6, 2018, R2-1810246, 3 pages.

(Continued)

*Primary Examiner* — Kouroush Mohebbi
(74) *Attorney, Agent, or Firm* — Womble Bond Dickinson (US) LLP

(57) ABSTRACT

Data transmission methods and apparatuses for wireless backhaul networks are described. A wireless backhaul node determines one or more reporting nodes for a data volume of a first-type data packet from a plurality of next-hop nodes of the wireless backhaul node on an uplink based on the data volume of the first-type data packet, a data volume of a second-type data packet, and a data volume of a third-type data packet. The wireless backhaul node sends, to the one or more reporting nodes, a buffer status report used to indicate the data volume of the first-type data packet. At least one of the first-type data packet, the second-type data packet, and the third-type data packet includes a data packet from an adaptation layer entity of the wireless backhaul node and/or a data packet from a radio link control layer entity of the wireless backhaul node.

18 Claims, 7 Drawing Sheets

(56) References Cited

FOREIGN PATENT DOCUMENTS

| CN | 102695180 A | 9/2012 |
|---|---|---|
| CN | 103873377 A | 6/2014 |
| CN | 104469846 A | 3/2015 |
| CN | 104754649 A | 7/2015 |
| CN | 105493560 A | 4/2016 |
| CN | 105992392 A | 10/2016 |
| CN | 106160800 A | 11/2016 |
| CN | 107231669 A | 10/2017 |
| CN | 108401304 A | 8/2018 |
| CN | 110636555 A | 12/2019 |

OTHER PUBLICATIONS

Huawei, HiSilicon, Pre-BSR Enabling Fast Scheduling, 3GPP TSG-RAN WG2 Meeting AH-1807, Montreal, Canada, May 2-6, 2018, R2-1810700, 2 pages.

ZTE, Considerations on adaptation layer in IAB, R3-182788, 3GPP TSG-RAN WG3 Meeting #100, Busan, Korea, May 21-25, 2018, 5 pages.

LUO Haibo et al., A Relay-Node Selection Strategy with Joint Optimization for Linear Wireless Sensor Networks. Chinese Journal of Sensors and Actuators, vol. 31, No. 8, Aug. 2018, 5 pages.

Ericsson, Uplink Scheduling in IAB Networks. 3GPP TSG-RAN WG2 Meeting #103b Chengdu, P. R. China, Oct. 8-12, 2018, R2-1814365, 5 pages.

Huawei, HiSilicon, Bearer mapping for control plane signaling in BH. 3GPP TSG-RAN WG2#103, Gothenburg, Sweden, 20 Aug. 24, 2018, R2-1812819, 4 pages.

* cited by examiner

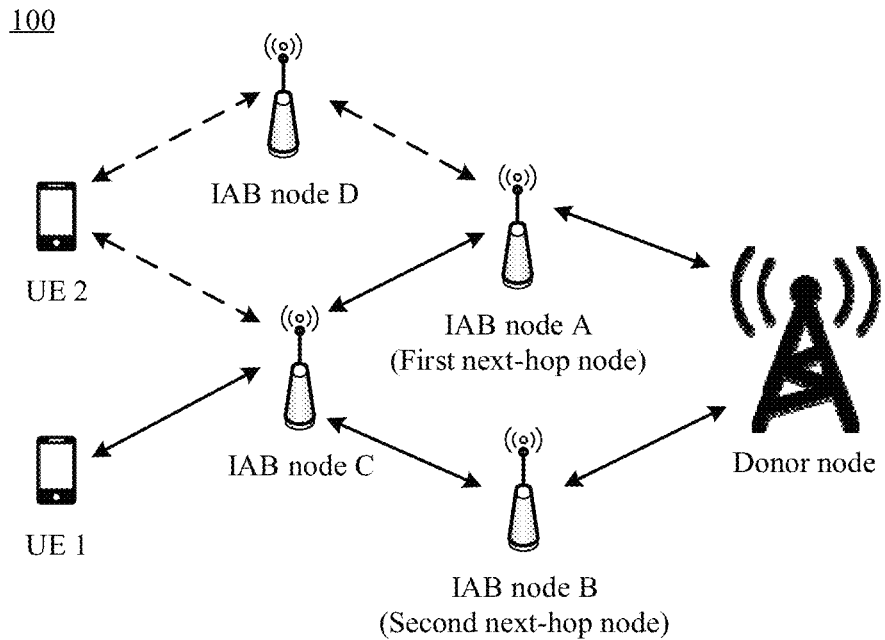

FIG. 1

A wireless backhaul node determines one or more reporting nodes for a data volume of a first-type data packet from a plurality of next-hop nodes based on the data volume of the first-type data packet, a data volume of a second-type data packet, and a data volume of a third-type data packet — S210

The wireless backhaul node sends a buffer status report to the one or more reporting nodes, where the buffer status report is used to indicate the data volume of the first-type data packet — S220

FIG. 2

DATA TRANSMISSION METHOD AND APPARATUS USED IN WIRELESS BACKHAUL NETWORK

CROSS-REFERENCE TO RELATED APPLICATIONS

This application is a continuation of International Application No. PCT/CN2019/110454, filed on Oct. 10, 2019, which claims priority to Chinese Patent Application No. 201811183943.7, filed on Oct. 11, 2018. The disclosures of the aforementioned applications are hereby incorporated by reference in their entireties.

TECHNICAL FIELD

The application relates to the communications field, and in particular, to a data transmission method and apparatus used in a wireless backhaul network in the communications field.

BACKGROUND

In a wireless backhaul network, for example, an integrated access and backhaul (IAB) network, a wireless backhaul node can provide a wireless access service for a terminal device. The wireless backhaul node may also be referred to as an IAB node or a relay node (RN). Data of the terminal device may be transmitted through a wireless backhaul link by the wireless backhaul node to a connected donor node, for example, an IAB donor or a donor base station (e.g., donor gNodeB, DgNB). The IAB network supports multi-hop networking and multi-connectivity networking. Therefore, there may be a plurality of transmission paths between the terminal device and the donor node. On a transmission path, there is a determined hierarchical relationship between wireless backhaul nodes, and between a wireless backhaul node and a donor node serving the wireless backhaul node. A node providing a backhaul service for each wireless backhaul node is a parent node (also referred to as a next-hop node of the wireless backhaul node on an uplink in the application). Correspondingly, each wireless backhaul node may be considered as a child node of the parent node. An adaptation layer is included on a backhaul link in the IAB network. The adaptation layer carries related information required for routing, a quality of service (QoS) guarantee, and terminal device and bearer identification, and provides routing and QoS mapping functions required for data forwarding.

Similar to that uplink transmission of the terminal device is scheduled by a node providing an access service for the terminal device, uplink transmission of the wireless backhaul node may also be scheduled by the parent node of the wireless backhaul node. The wireless backhaul node on the backhaul link in the IAB network may collect statistics about a volume of to-be-sent data, and notify the parent node of the wireless backhaul node of the data volume that is obtained through statistics collection, so that the parent node allocates an uplink scheduling resource to the wireless backhaul node based on the data volume. In the IAB network, one wireless backhaul node may have a plurality of parent nodes on the uplink, and there may be a plurality of transmission paths that are separately connected by using the plurality of parent nodes and that are between the wireless backhaul node and the donor node. In this case, how to report a volume of data to be sent by the wireless backhaul node becomes a technical problem to be resolved urgently.

SUMMARY

Embodiments of the application provide a data transmission method and apparatus used in a wireless backhaul network, to flexibly report a volume of data to be sent by a wireless backhaul node, thereby performing uplink offloading by properly using a plurality of links.

In at least some embodiments, a data transmission method used in a wireless backhaul network is provided. The wireless backhaul network includes a wireless backhaul node, and the wireless backhaul node has a plurality of next-hop nodes on an uplink. The method includes: the wireless backhaul node determines one or more reporting nodes for a data volume of a first-type data packet from the plurality of next-hop nodes based on the data volume of the first-type data packet, a data volume of a second-type data packet, and a data volume of a third-type data packet. The wireless backhaul node sends a buffer status report to the one or more reporting nodes, where the buffer status report is used to indicate the data volume of the first-type data packet. At least one of the first-type data packet, the second-type data packet, and the third-type data packet includes a data packet from an adaptation layer entity of the wireless backhaul node, a data packet from a radio link control layer entity of the wireless backhaul node, or the data packet from the adaptation layer entity of the wireless backhaul node and the data packet from the radio link control layer entity of the wireless backhaul node; the first-type data packet can be transmitted through a first next-hop node in the plurality of next-hop nodes and a second next-hop node in the plurality of next-hop nodes; the second-type data packet can be transmitted only through the first next-hop node in the plurality of next-hop nodes; and the third-type data packet can be transmitted only through the second next-hop node in the plurality of next-hop nodes.

In an embodiment of the application, the first-type data packet may be referred to as a "data packet that can be flexibly routed", and correspondingly, the second-type data packet and the third-type data packet may be referred to as "data packets that cannot be flexibly routed". The data volume of the first-type data packet may be greater than or equal to 0, and the data volume of the second-type data packet may also be greater than or equal to 0. It should be understood that, uplink transmission of a terminal device may be scheduled by a node providing an access service for the terminal device. Similarly, uplink transmission of the wireless backhaul node may be scheduled and allocated an uplink scheduling resource by a parent node of the wireless backhaul node. Therefore, the wireless backhaul node may feed back a data volume of a to-be-sent data packet to the parent node of the wireless backhaul node. If the wireless backhaul node feeds back the data volume of the to-be-sent data packet to the first next-hop node, the first next-hop node may allocate an uplink scheduling resource to the wireless backhaul node, to schedule the wireless backhaul node to perform data transmission. If the wireless backhaul node feeds back the data volume of the to-be-sent data packet to the second next-hop node, the second next-hop node may allocate an uplink scheduling resource to the wireless backhaul node, to schedule the wireless backhaul node to perform data transmission.

In the application, a parent node that is of the wireless backhaul node and that receives the data volume of the to-be-sent data packet fed back by the wireless backhaul node is referred to as a reporting node. The parent node of the wireless backhaul node may be another wireless backhaul node, or may be a donor node. Therefore, the reporting node may be another wireless backhaul node, or may be a donor node. If the wireless backhaul node selects the first next-hop node as the reporting node, it indicates that the wireless backhaul node expects to transmit the to-be-sent data packet through the first next-hop node. If the wireless backhaul node selects the second next-hop node as the reporting node, it indicates that the wireless backhaul node expects to transmit the to-be-sent data packet through the second next-hop node. After the wireless backhaul node determines the one or more reporting nodes for the data volume of the first-type data packet, the wireless backhaul node may notify the one or more reporting nodes of the data volume, for example, send the buffer status report (BSR), to indicate the data volume of the first-type data packet.

According to the data transmission method used in a wireless backhaul network in an embodiment of the application, the wireless backhaul node selects, for a data packet that can be flexibly routed (e.g., the first-type data packet), a reporting node from the plurality of next-hop nodes of the wireless backhaul node on the uplink based on data volumes of different types of data packets, and indicates, to the reporting node, a data volume of such a data packet that can be flexibly routed, so that such a data packet can be transmitted through the reporting node, thereby performing uplink offloading by properly using a plurality of links. This helps improve uplink data transmission efficiency.

In at least some embodiments, when a sum of the data volume of the first-type data packet, the data volume of the second-type data packet, and the data volume of the third-type data packet is greater than or equal to a first threshold, the one or more reporting nodes are the first next-hop node and the second next-hop node.

Optionally, if the sum of the data volume of the first-type data packet, the data volume of the second-type data packet, and the data volume of the third-type data packet is greater than or equal to the first threshold, it indicates that a data volume of a to-be-transmitted data packet is relatively large. The reason is as follows. The second-type data packet is transmitted through a link corresponding to the first next-hop node, the third-type data packet is transmitted through a link corresponding to the second next-hop node, and the first-type data packet is transmitted through only one link. This may cause uplink load on a link between the wireless backhaul node and one of the next-hop nodes of the wireless backhaul node to be excessively heavy. In this case, the wireless backhaul node may report the data volume of the first-type data packet to both the first next-hop node and the second next-hop node.

In at least some embodiments, the method further includes: the wireless backhaul node receives first configuration information from a donor node, where the first configuration information is used to indicate the first threshold.

In at least some embodiments, when the sum of the data volume of the first-type data packet, the data volume of the second-type data packet, and the data volume of the third-type data packet is less than a second threshold, the one or more reporting nodes are one of the first next-hop node and the second next-hop node.

Optionally, if the sum of the data volume of the first-type data packet, the data volume of the second-type data packet, and the data volume of the third-type data packet is less than the second threshold, it indicates that the data volume of the to-be-transmitted data packet is relatively small, and burden is not caused to a node when the first-type data packet is transmitted through only one path. In this case, the wireless backhaul node may select only one of the first next-hop node and the second next-hop node as the reporting node, that is, transmit the first-type data packet through only one of the first next-hop node and the second next-hop node.

Optionally, when only one next-hop node needs to be selected as the reporting node, the wireless backhaul node may select one default node as the reporting node. The default node may be the first next-hop node, or may be the second next-hop node, and is agreed on in a communication protocol or configured by the donor node. This is not limited in an embodiment of the application.

In at least some embodiments, the method further includes: the wireless backhaul node receives second configuration information from the donor node, where the second configuration information is used to indicate the second threshold.

Optionally, the first configuration information and the second configuration information may be a same piece of configuration information. Optionally, the first threshold is equal to the second threshold. In this case, the donor node may configure one threshold for the wireless backhaul node by using one piece of configuration information.

In at least some embodiments, when a sum of the data volume of the first-type data packet and the data volume of the second-type data packet is less than a third threshold, and a sum of the data volume of the first-type data packet and the data volume of the third-type data packet is greater than or equal to a fourth threshold, the one or more reporting nodes are the first next-hop node.

In one embodiment, the second-type data packet is transmitted through the link corresponding to the first next-hop node, and the third-type data packet is transmitted through the link corresponding to the second next-hop node. If the sum of the data volume of the first-type data packet and the data volume of the second-type data packet is less than the third threshold, and the sum of the data volume of the first-type data packet and the data volume of the third-type data packet is greater than or equal to the fourth threshold, it indicates that uplink load on a link between the wireless backhaul node and the first next-hop node is lighter than uplink load on a link between the wireless backhaul node and the second next-hop node, and the wireless backhaul node may expect to transmit the first-type data packet through the first next-hop node. Therefore, the wireless backhaul node may determine the first next-hop node as the reporting node, and report the data volume of the first-type data packet to the first next-hop node.

In at least some embodiments, the method further includes: the wireless backhaul node receives third configuration information from the donor node, where the third configuration information is used to indicate the third threshold and the fourth threshold.

In at least some embodiments, when the sum of the data volume of the first-type data packet and the data volume of the second-type data packet is greater than or equal to a fifth threshold, and the sum of the data volume of the first-type data packet and the data volume of the third-type data packet is less than a sixth threshold, the one or more reporting nodes are the second next-hop node.

In one embodiment, the second-type data packet is transmitted through the link corresponding to the first next-hop node, and the third-type data packet is transmitted through the link corresponding to the second next-hop node. If the sum of the data volume of the first-type data packet and the data volume of the second-type data packet is greater than or equal to the fifth threshold, and the sum of the data volume of the first-type data packet and the data volume of the third-type data packet is less than the sixth threshold, it indicates that uplink load on the link between the wireless backhaul node and the second next-hop node is lighter than uplink load on the link between the wireless backhaul node and the first next-hop node, and the wireless backhaul node may expect to transmit the second-type data packet through the second next-hop node. Therefore, the wireless backhaul node may determine the second next-hop node as the reporting node, and report the data volume of the first-type data packet of the second next-hop node.

In at least some embodiments, the method further includes: the wireless backhaul node receives fourth configuration information from the donor node, where the fourth configuration information is used to indicate the fifth threshold and the sixth threshold.

In at least some embodiments, when the sum of the data volume of the first-type data packet and the data volume of the second-type data packet is less than a seventh threshold, and the sum of the data volume of the first-type data packet and the data volume of the third-type data packet is less than an eighth threshold, the one or more reporting nodes are one of the first next-hop node and the second next-hop node.

In one embodiment, the second-type data packet is transmitted through the link corresponding to the first next-hop node, and the third-type data packet is transmitted through the link corresponding to the second next-hop node. If the sum of the data volume of the first-type data packet and the data volume of the second-type data packet is less than the seventh threshold, and the sum of the data volume of the first-type data packet and the data volume of the third-type data packet is less than the eighth threshold, it indicates that uplink load on the link between the wireless backhaul node and the second next-hop node and uplink load on the link between the wireless backhaul node and the first next-hop node are both relatively light. The wireless backhaul node may determine either of the first next-hop node and the second next-hop node as the reporting node, and report the data volume of the first-type data packet to the reporting node.

In at least some embodiments, the method further includes: the wireless backhaul node receives fifth configuration information from the donor node, where the fifth configuration information is used to indicate the seventh threshold and the eighth threshold.

In at least some embodiments, when the sum of the data volume of the first-type data packet and the data volume of the second-type data packet is greater than or equal to a ninth threshold, and the sum of the data volume of the first-type data packet and the data volume of the third-type data packet is greater than or equal to a tenth threshold, the one or more reporting nodes are the first next-hop node and the second next-hop node.

In one embodiment, if the sum of the data volume of the first-type data packet and the data volume of the second-type data packet is greater than or equal to the ninth threshold, and the sum of the data volume of the first-type data packet and the data volume of the third-type data packet is greater than or equal to the ninth threshold, it indicates that uplink load on the link between the wireless backhaul node and the second next-hop node and uplink load on the link between the wireless backhaul node and the first next-hop node are both relatively heavy. The wireless backhaul node may determine the first next-hop node and the second next-hop node as the reporting nodes, and report the data volume of the first-type data packet to both the first next-hop node and the second next-hop node. The first next-hop node and the second next-hop node each can allocate, to the wireless backhaul node, an uplink scheduling resource corresponding to the data volume of the first-type data packet, or some uplink scheduling resources may be allocated to the wireless backhaul node through coordination of the donor node or through coordination between the first next-hop node and the second next-hop node. This is not limited in an embodiment of the application.

In at least some embodiments, the method further includes: the wireless backhaul node receives sixth configuration information from the donor node, where the fifth configuration information is used to indicate the ninth threshold and the tenth threshold.

Optionally, the third configuration information, the fourth configuration information, the fifth configuration information, and the sixth configuration information may be a same piece of configuration information. Optionally, at least two of the third threshold, the fifth threshold, the seventh threshold, and the ninth threshold are the same, and at least two of the fourth threshold, the sixth threshold, the eighth threshold, and the tenth threshold are the same. If the third threshold, the fifth threshold, the seventh threshold, and the ninth threshold are all the same, and the fourth threshold, the sixth threshold, the eighth threshold, and the tenth threshold are all the same, the donor node may configure two of the foregoing thresholds for the wireless backhaul node by using one piece of configuration information.

In at least some embodiments, at least one of the first-type data packet, the second-type data packet, and the third-type data packet further includes a data packet from a packet data convergence protocol layer entity of the wireless backhaul node.

In one embodiment, at least one of the first-type data packet, the second-type data packet, and the third-type data packet may further include the data packet from the packet data convergence protocol (PDCP) layer entity of the wireless backhaul node. In this case, the wireless backhaul node may serve as a mobile terminal (mobile termination, MT) (a hypothetical terminal device), and a service of the wireless backhaul node is transmitted through the parent node of the wireless backhaul node.

In at least some embodiments, an adaptation layer of the wireless backhaul node is located between a radio link control layer of the wireless backhaul node and a media access control layer of the wireless backhaul node. The method further includes: the wireless backhaul node sends at least one of the first-type data packet, the second-type data packet, or the third-type data packet to the first next-hop node, to the second next-hop node, or to the first next-hop node and the second next-hop node in a first routing mode or a second routing mode in a hop-by-hop automatic repeat request mode or a hop-by-hop reassembly mode. In the first routing mode, different data packets from a same radio link control layer entity need to be routed to a same next-hop node in the plurality of next-hop nodes; and in the second routing mode, different data packets from a same radio link control layer entity can be routed to different next-hop nodes in the plurality of next-hop nodes, but different segments of a same data packet need to be routed to a same next-hop node in the plurality of next-hop nodes.

Because the hop-by-hop automatic repeat request (ARQ) mode or the hop-by-hop reassembly mode is used, a node at each hop on a transmission path can reassemble a data packet and detect whether the data packet is correctly received, to feed back an acknowledgement (ACK) message or a negative acknowledgement (non-acknowledgement, NACK) message to a previous-hop node. In an embodiment of the application, routing restriction is performed on the wireless backhaul node, so that it can be ensured that different segments of one data packet at the RLC layer of the wireless backhaul node are sent to a same next-hop node, thereby avoiding a data transmission failure that is caused because different segments are transmitted through different paths and a neighboring node cannot restore a correct data packet through reassembly.

In at least some embodiments, a data transmission method used in a wireless backhaul network is further provided. The wireless backhaul network includes a wireless backhaul node, the wireless backhaul node has a plurality of next-hop nodes, and an adaptation layer of the wireless backhaul node is located between a radio link control layer of the wireless backhaul node and a media access control layer of the wireless backhaul node. The method includes: the wireless backhaul node sends a data packet to a next-hop node in the plurality of next-hop nodes in a first routing mode or a second routing mode in a hop-by-hop automatic repeat request mode or a hop-by-hop reassembly mode. In the first routing mode, different data packets from a same radio link control layer entity need to be routed to a same next-hop node in the plurality of next-hop nodes; and in the second routing mode, different data packets from a same radio link control layer entity can be routed to different next-hop nodes in the plurality of next-hop nodes, but different segments of a same data packet need to be routed to a same next-hop node in the plurality of next-hop nodes.

It should be understood that the plurality of next-hop nodes herein may be next-hop nodes on an uplink, or may be next-hop nodes on a downlink. This is not limited in an embodiment of the application.

In an embodiment of the application, routing restriction is performed on the wireless backhaul node, so that it can be ensured that different segments of one data packet at the RLC layer of the wireless backhaul node are sent to a same next-hop node, thereby avoiding a data transmission failure that is caused because different segments are transmitted through different paths and a neighboring node cannot restore a correct data packet through reassembly.

In at least some embodiments, a data transmission apparatus used in a wireless backhaul network is provided, configured to perform the method according to any one of the embodiments described in the application. In one embodiment, the apparatus includes units configured to perform the method according to any one of the the embodiments described in the application.

In at least some embodiments, another data transmission apparatus used in a wireless backhaul network is provided. The apparatus includes a transceiver, a memory, and a processor. The transceiver, the memory, and the processor communicate with each other through an internal connection path. The memory is configured to store an instruction. The processor is configured to execute the instruction stored in the memory, to control a receiver to receive a signal, and control a transmitter to send a signal. In addition, when the processor executes the instruction stored in the memory, the processor is enabled to perform the method according to any one of the embodiments described in the application.

In at least some embodiments, a computer program product is provided. The computer program product includes computer program code; and when the computer program code is run on a computer, the computer is enabled to perform the methods according to the embodiments described in the application.

In at least some embodiments, a computer-readable medium is provided. The computer-readable medium is configured to store a computer program, and the computer program includes an instruction used to perform the methods according to embodiments described in the application.

In at least some embodiments, a chip is provided, including a processor, configured to invoke, from a memory, and run an instruction stored in the memory, so that a communications device in which the chip is installed performs the methods according to the embodiments described in the application. Optionally, the communications device is the data transmission apparatus used in a wireless backhaul network.

In at least some embodiments, another chip is provided, including an input interface, an output interface, a processor, and a memory. The input interface, the output interface, the processor, and the memory are connected to each other through an internal connection path. The processor is configured to execute code in the memory. When the code is executed, the processor is configured to perform the methods according to the embodiments described in the application.

BRIEF DESCRIPTION OF DRAWINGS

FIG. 1 is a schematic diagram of a communications system according to an embodiment of the application;

FIG. 2 is a schematic flowchart of a data transmission method used in a wireless backhaul network according to an embodiment of the application;

DESCRIPTION OF EMBODIMENTS

Figure 3:
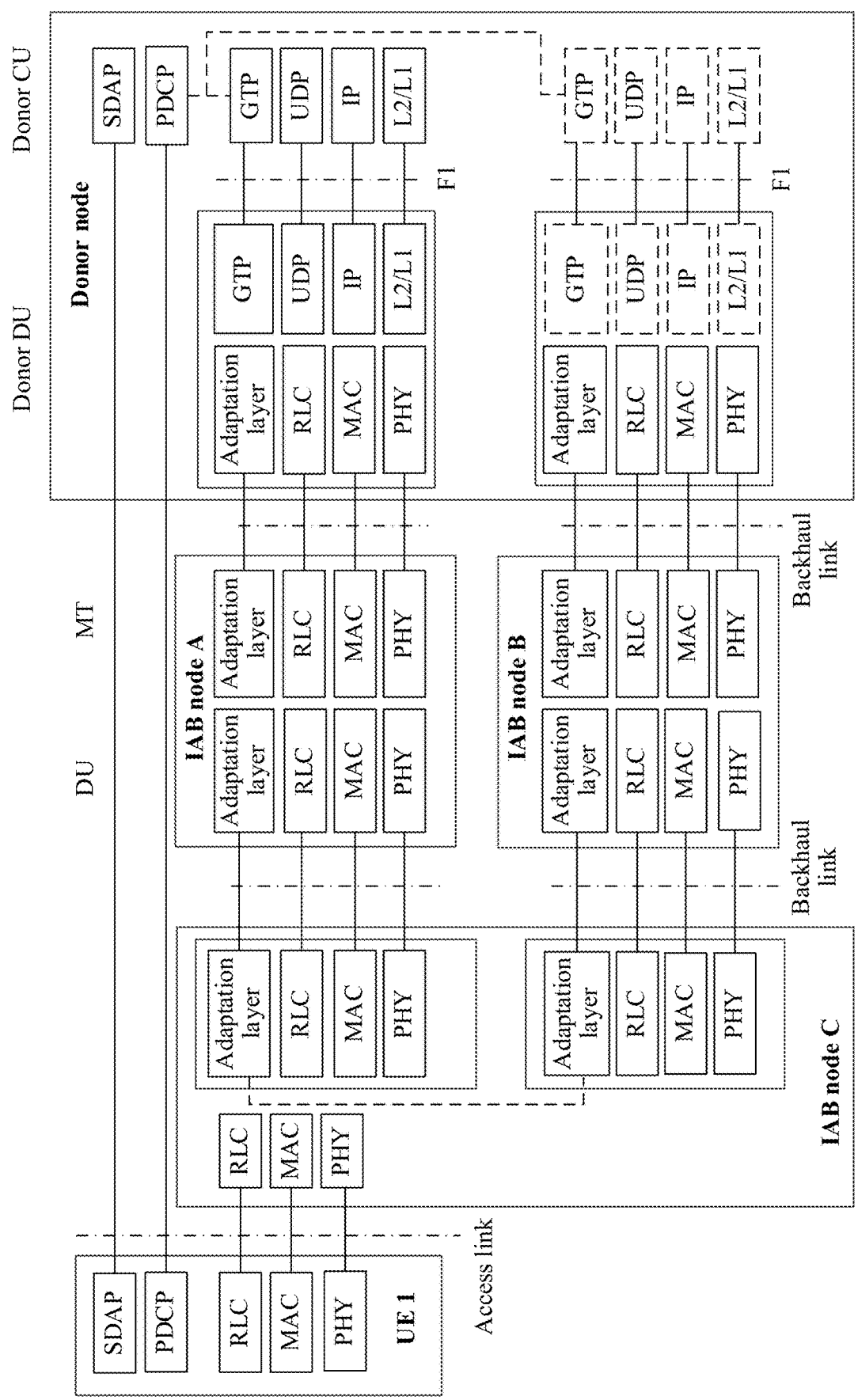
FIG. 3 is a diagram of a user plane protocol stack architecture according to an embodiment of the application.

The following describes the technical solutions in the application with reference to the accompanying drawings.

It should be understood that names of all nodes and messages in the application are merely names specified for ease of description in the application, and may be different names in an actual network. It should not be understood that names of various nodes and messages are limited in the application. On the contrary, any name that has a function the same as or similar to that of the node or the message used in the application is considered as a method or an equivalent replacement in the application, and falls within the protection scope of the application. Details are not described below.

Compared with a 4th generation mobile communications system, a 5th generation (5G) mobile communications system has stricter requirements on various network performance indicators in an all-round manner. For example, a capacity indicator is increased by 1000 times, wider coverage is required, and ultra-high reliability and an ultra-low latency are required. On the one hand, in consideration of abundant frequency resources on high-frequency carriers, high-frequency small cell networking is increasingly popular in hotspot areas to meet an ultra-high capacity requirement of 5G. The high-frequency carrier has a relatively poor propagation characteristic, is severely attenuated due to blocking, and has a small coverage area. Therefore, a large quantity of small cells need to be densely deployed. Correspondingly, it is costly and difficult to provide fiber backhaul for these densely deployed small cells. Therefore, an economical and convenient backhaul solution is required. On the other hand, to meet a wide coverage requirement, it is difficult and costly to deploy optical fibers to provide network coverage in some remote areas. Therefore, a flexible and convenient access and backhaul solution also needs to be designed.

To further reduce deployment costs and improve deployment flexibility, an integrated access and backhaul (IAB) technology is introduced into 5G. A wireless transmission solution is used for both an access link and a backhaul link, so that optical fiber deployment can be avoided.

In the application, a node that supports integrated access and backhaul is referred to as a wireless backhaul node, and the wireless backhaul node may also be referred to as a relay node (RN) or an IAB node. For ease of description, the IAB node is used as an example for description below. The IAB node may provide a wireless access service for a terminal device. Data (which may include user plane data and control plane signaling) of the terminal device is transmitted through a wireless backhaul link by the IAB node to a connected donor node. The donor node is also referred to as an IAB donor or a donor base station (donor gNodeB, DgNB). For example, the DgNB may be an access network element having a complete base station function, or may be an access network element in a form in which a central unit (centralized unit, CU) is separated from a distributed unit (DU). The DgNB is connected to a core network element serving the terminal device, for example, connected to a 5G core (5G core, 5GC), and provides a wireless backhaul function for the IAB node. For ease of description, in this specification, a central unit of a donor node is referred to as a donor CU, and a distributed unit of the donor node is referred to as a donor DU. The donor CU may also be in a form in which a control plane (CP) is separated from a user plane (UP). For example, one CU includes one CU-CP and a plurality of CU-UPs. This is not limited in the embodiments of the application.

In consideration of a service transmission reliability requirement, the IAB node may be enabled to support multi-connectivity, to cope with an exception that may occur on a backhaul link, for example, an exception such as link interruption or blockage and load fluctuation, thereby improving transmission reliability. The foregoing multi-connectivity may be dual connectivity (DC) defined in a 3rd generation partnership project (3GPP) protocol. This is not limited in the embodiments of the application.

An IAB network supports multi-hop networking and multi-connectivity networking. Therefore, there may be a plurality of transmission paths between the terminal device and the donor node. On a path, there is a determined hierarchical relationship between IAB nodes and between an IAB node and a donor node serving the IAB node. In the embodiments of the application, each IAB node considers a node providing a backhaul service for the IAB node as a parent node. Correspondingly, each IAB node may be considered as a child node of the parent node of the IAB node. In other words, a parent node of an IAB node is a next-hop node of the IAB node on an uplink, and a child node of the IAB node is a previous-hop node of the IAB node on the uplink.

For ease of description, basic terms used in the application are defined below.

Next-hop node (also referred to as a parent node) on an uplink: the next-hop node is a node providing a wireless backhaul service.

Previous-hop node (also referred to as a child node) on the uplink: the previous-hop node is a node that transmits data to a network by using a wireless backhaul service, or a node that receives data from a network by using a wireless backhaul service. The network herein is a core network or another network, such as the Internet or a private network.

Access link (AL): the access link is a radio link used during communication between a terminal device and a node (for example, an IAB node, a donor node, or a donor DU) providing an access service for the terminal device, and includes an uplink transmission link and a downlink transmission link. Uplink transmission on the access link is also referred to as uplink transmission of the access link, and downlink transmission on the access link is also referred to as downlink transmission of the access link.

Backhaul link (BL): the backhaul link is a radio link used during communication between a node and a parent node of the node, and includes an uplink transmission link and a downlink transmission link. Uplink transmission on the backhaul link is also referred to as uplink transmission of the backhaul link, and downlink transmission on the backhaul link is also referred to as downlink transmission of the backhaul link. The node includes but is not limited to the foregoing IAB node.

Path: the path is a full route from a sending node to a receiving node. The path includes at least one link. In the application, the link represents a connection between neighboring nodes.

To better understand a data transmission method and apparatus used in a wireless backhaul network in the embodiments of the application, the following first describes a communications system to which the embodiments of the application are applied. FIG. 1 is a schematic diagram of a communications system to which the embodiments of the application are applied.

It should be noted that, the communications system to which the embodiments of the application are applicable includes but is not limited to: a narrowband Internet of Things (NB-IoT) system, a wireless local access network (WLAN) system, a long term evolution (LTE) system, a next generation 5G mobile communications system, or a subsequently evolved communications system such as a new radio (NR) communications system.

The communications system shown in FIG. 1 is an IAB system. The IAB system includes one donor node, an IAB node A, an IAB node B, an IAB node C, and a terminal device (user equipment UE) 1 is used as an example in FIG. 1) served by the IAB node C. A parent node of the IAB node A is the donor node, and the IAB node A is a parent node of the IAB node C. A parent node of the IAB node B is the donor node, and the IAB node B is a parent node of the IAB node C. Therefore, the IAB node C has two parent nodes. In other words, the IAB node C includes two next-hop nodes on an uplink, and an uplink data packet that needs to be sent through the IAB node C may be transmitted to the donor node through two paths. In the application, the IAB node A is also referred to as a first next-hop node of the IAB node C, and the IAB node B is also referred to as a second next-hop node of the IAB node C.

In one embodiment, an uplink data packet of the UE 1 may be transmitted through one or more IAB nodes to the donor node, and then sent by the donor node to a mobile gateway device (for example, a user plane function (UPF) unit in a 5G core). A downlink data packet to be sent to the UE 1 is received by the donor node from the mobile gateway device, and then sent to the UE through the IAB node. In FIG. 1, there are two available paths for data transmission between the UE 1 and the donor node: a path 1: the UE 1←→the IAB node C←→the IAB node A←→the donor node; and a path 2: the UE 1←→the IAB node C←→the IAB node B←→the donor node.

Optionally, the IAB system may further include another quantity of terminal devices and another quantity of IAB nodes. As shown in FIG. 1, the IAB system further includes an IAB node D and a terminal device (UE 2 is used as an example in FIG. 1) served by the IAB node D. A parent node of the IAB node D is the IAB node A, and the IAB node C may also serve the UE 2.

Therefore, there are three available paths for data transmission between the UE 2 and the donor node: a path 1: the UE 2←→the IAB node C←→the IAB node A←→the donor node; a path 2: the UE 2←→the IAB node C←→the IAB node B←→the donor node; and a path 3: the UE 2←→the IAB node D←→the IAB node A←→the donor node.

An IAB network shown in FIG. 1 is merely an example. In an IAB scenario with multi-hop and multi-connectivity combined, there are more possible IAB networks. For example, a donor node and an IAB node connected to another donor node form dual connectivity to serve a terminal device. Details are not described herein.

It should be understood that, the donor node may include but is not limited to an evolved NodeB (eNB), a radio network controller (RNC), a NodeB (node B, NB), a base station controller (BSC), a base transceiver station (BTS), a home base station (for example, a home evolved NodeB or a home node B, HNB), a baseband unit (BBU), an eLTE (evolved LTE, eLTE) base station, a next generation base station (next generation node B, gNB), and the like.

It should be further understood that, the terminal device may include but is not limited to any one of user equipment (UE), a mobile station, an access terminal, a subscriber unit, a subscriber station, a mobile station, a remote station, a remote terminal, a mobile device, a terminal, a wireless communications device, a user agent, a station (ST) in a wireless local access network (WLAN), a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a mobile station in a future 5G network, a terminal device in a future evolved public land mobile network (PLMN) network, and the like.

The IAB node is a name of a relay node in the IAB network, and constitutes no limitation on the solutions in the application. In the application, the IAB node is used only for the purpose of description, and it does not mean that the solutions in the application are used only in an NR scenario. In the application, the IAB node may be any node or device that has a relay function. For example, the IAB node may be any one of the foregoing base stations or terminal devices that have a forwarding function, or may be in a form of an independent device. This is not limited in the embodiments of the application.

In addition, there are a plurality of alternative solutions for an IAB user plane protocol architecture, and the IAB user plane protocol architecture may be classified into a layer 2 IAB architecture defined in a 3GPP protocol or a layer 3 IAB architecture defined in a 3GPP protocol. The IAB node shown in FIG. 1, for example, the IAB node A, the IAB node B, or the IAB node C, may exist in two forms. In one form, the IAB node exists as an independent access node, and can independently manage a terminal device accessing the IAB node. A relay in such a form usually needs to have a complete protocol stack function of a base station, for example, a radio resource control (RRC) function, and such a relay is usually referred to as a layer 3 relay. In the other form, the relay node and the donor node can jointly perform user management, and such a relay usually has some layer 2 protocol stack functions of the base station, and is referred to as a layer 2 relay. The layer 2 relay usually exists as a DU of the donor node in an NR control and bearer separation (central unit and Distributed unit, CU-DU) architecture, and performs control plane communication with the donor node or a CU of the donor node through an F1 application protocol (F1AP) interface.

In a layer 2 IAB architecture, a packet data convergence protocol (PDCP) layer and a service data adaptation protocol (SDAP) layer that are peer to those of UE are located on the donor node or the CU of the donor node. The IAB node forwards UE data (which may include user plane data and control plane signaling) at a radio link control (RLC) layer and below. For example, a forwarded data packet may be a PDCP layer protocol data unit (PDU) of the UE or an RLC layer PDU of the UE.

It should be understood that, for a protocol layer, an information unit from a higher protocol layer above the protocol layer may be referred to as a service data unit (SDU), and an information unit that is processed at the protocol layer and then sent to a lower protocol layer may be referred to as a PDU. For example, an information unit that is of a higher protocol layer and that is received by the PDCP layer may be referred to as a PDCP SDU, and an information unit that is processed at the PDCP layer and sent to a lower layer may be referred to as a PDCP PDU. The processing herein may include operations such as allocating a serial number (SN), header compression, encryption, integrity protection, and adding a packet header. In the application, a protocol layer that is first processed by a sending node is located above a protocol layer that is processed later by the sending node, and a protocol layer that is first processed by a receiving node is located below a protocol layer that is processed later by the receiving node. For example, the sending node is a wireless backhaul node, and the receiving node is a donor node. Alternatively, the sending node is a donor node, and the receiving node is a wireless backhaul node.

In addition, an adaptation layer is introduced into a backhaul link of a layer 2 IAB node. The adaptation layer carries some related information required for routing, quality of service (QoS) guarantee, and UE and bearer identification, and provides routing and QoS mapping functions required for data forwarding. It should be understood that the foregoing adaptation layer may be an independent protocol layer, or may be a sublayer or a sub-module of an existing protocol layer, for example, a sublayer of the RLC layer, or a sublayer of a media access control (MAC) layer. This is not limited in the embodiments of the application. It should be further understood that, for ease of description only in this specification, a newly introduced protocol layer that has routing and QoS mapping functions is referred to as an adaptation layer. However, in an actual network, the protocol layer may have another name. This is not limited in the embodiments of the application.

Further, when the adaptation layer may be an independent protocol layer, the adaptation layer may be deployed in two manners. For different deployment manners, data packet processing manners are different. The following separately describes the two deployment manners.

Manner 1: the adaptation layer is deployed above the RLC layer. This deployment manner has the following characteristics:

1. At the adaptation layer, a data packet may be mapped to an RLC channel of the backhaul link. The RLC channel of the backhaul link may be in a one-to-one correspondence with a UE bearer (also referred to as a UE radio bearer). Alternatively, aggregated mapping may be performed on a plurality of UE bearers to an RLC channel of a same backhaul link. The aggregated mapping herein refers to many-to-one mapping. That aggregated mapping is performed on the plurality of UE bearers to the RLC channel of the same backhaul link means that data on the plurality of UE bearers may be sent through the RLC channel of the same backhaul link.

2. The IAB node may directly map an RLC channel of a previous-hop backhaul link to an RLC channel of a next-hop backhaul link, or may map a UE bearer to an RLC channel of a next-hop link.

3. An RLC layer entity of the IAB node on the backhaul link is in a one-to-one correspondence with a logical channel (LCH) or an RLC bearer or an RLC channel of the IAB node on the backhaul link.

4. For an RLC acknowledged mode (AM), only a hop-by-hop automatic repeat request (ARQ) mode can be used.

Manner 2: the adaptation layer is deployed below the RLC layer and above the MAC layer, that is, the adaptation layer is deployed between the MAC layer and the RLC layer. This deployment manner has the following characteristics:

1. At the adaptation layer, a data packet may be mapped to an LCH of the backhaul link. The LCH of the backhaul link may be in a one-to-one correspondence with a UE bearer. Alternatively, aggregated mapping may be performed on a plurality of UE bearers to an LCH of a same backhaul link. The aggregated mapping herein refers to many-to-one mapping. That aggregated mapping is performed on the plurality of UE bearers to the LCH of the same backhaul link means that data on the plurality of UE bearers may be sent through the LCH of the same backhaul link.

2. The IAB node may directly map an LCH of a previous-hop backhaul link to an LCH of a next-hop backhaul link, or may map a UE bearer to an LCH of a next-hop link.

3. An RLC entity of the IAB node on the backhaul link is in a one-to-one correspondence with a UE bearer.

4. For an RLC acknowledged mode (AM), both an end-to-end ARQ mode (end-to-end ARQ) and a hop-by-hop ARQ mode (hop-by-hop ARQ) can be used.

5. Both end-to-end reassembly (reassemble) and hop-by-hop reassembly can be used.

It should be understood that, in the end-to-end ARQ mode, an ARQ related function is configured only on RLC entities at two ends, and an RLC layer of an intermediate IAB node has a segmentation function, and/or a re-segmentation function, or both the segmentation function and the re-segmentation function. The intermediate IAB node does not need to perform ARQ functions (including feedback on data packet reception when the intermediate IAB node serves as a receiving node, and retransmission of an unacknowledged data packet when the intermediate IAB node serves as a sending node). Segmentation is specific to a complete RLC service data unit SDU, and re-segmentation is specific to an RLC SDU segment. Uplink transmission is used as an example. The UE sends a data packet to the donor node through the IAB node. When correctly receiving the data packet, the donor node may feed back an acknowledgement (ACK) message to the IAB node. When not correctly receiving the data packet, the donor node may feed back a negative acknowledgement (non-acknowledgement, NACK) message to the IAB node. The IAB node only forwards these messages. When the donor node feeds back the NACK message, the UE may resend the data packet to the donor node through the IAB node, until the donor node feeds back the ACK message for the data packet.

In the hop-by-hop ARQ mode, all nodes (including the IAB nodes) in the IAB network are configured with an ARQ related function. The RLC layer of the IAB node has a segmentation function and/or a re-segmentation function, and also has the ARQ-related function. That is, the IAB node can not only forward a data packet, but also can feed back, to a node (a previous-hop node of the IAB node) that sends the data packet, whether the data packet is correctly received.

It should be further understood that the two modes, namely, hop-by-hop reassembly and end-to-end reassembly, may be used for a data packet in a transmission process.

The hop-by-hop reassembly is as follows: When a sending node sends a data packet to a receiving node through N intermediate nodes, if the sending node segments an RLC SDU at an RLC layer on each link segment, the intermediate nodes may reassemble these segments at RLC layers on receive sides of the intermediate nodes, so that a complete RLC SDU can be restored.

The end-to-end reassembly is as follows: When a sending node sends a data packet to a receiving node through N intermediate nodes, the sending node may segment an RLC SDU at an RLC layer; or the N intermediate nodes between the sending node and the receiving node may segment a complete RLC SDU, or continue to segment RLC SDU segments (segment), but the intermediate nodes do not perform reassembly on receive sides of the intermediate nodes until these RLC SDU segments are transmitted to the receiving node. The receiving node may reassemble all received segments at an RLC layer on a receive side of the receiving node, to restore the complete RLC SDU.

It may be understood that, when the hop-by-hop ARQ mode is used in the IAB network, a corresponding reassembly mode is also hop-by-hop reassembly. When the end-to-end ARQ mode is used, a reassembly mode may be hop-by-hop reassembly or end-to-end reassembly.

Similar to that uplink transmission of the UE is scheduled by a node providing an access service for the UE, uplink transmission of the IAB node is also scheduled by the parent node of the IAB node on the uplink. The IAB node may collect statistics about a volume of to-be-sent data, and report the data volume that is obtained through statistics collection to the parent node of the IAB node on the uplink, so that the parent node allocates a corresponding uplink scheduling resource to the IAB node. However, in the IAB network, one IAB node may have a plurality of parent nodes on the uplink, in other words, there may be a plurality of transmission paths between the IAB node and a donor node. In view of this, the application provides a new data transmission method used in a wireless backhaul network, to flexibly report a volume of data to be sent by an IAB node, thereby performing uplink offloading by properly using a plurality of links.

FIG. 2 is a schematic flowchart of a data transmission method 200 used in a wireless backhaul network according to an embodiment of the application. The method 200 may be applied to the communications system 100 shown in FIG. 1. However, an embodiment of the application is not limited thereto. The wireless backhaul network includes a wireless backhaul node, and the wireless backhaul node has a plurality of next-hop nodes on an uplink.

S210. The wireless backhaul node determines one or more reporting nodes for a data volume of a first-type data packet from the plurality of next-hop nodes based on the data volume of the first-type data packet, a data volume of a second-type data packet, and a data volume of a third-type data packet.

S220. The wireless backhaul node sends a buffer status report to the one or more reporting nodes, where the buffer status report is used to indicate the data volume of the first-type data packet.

At least one of the first-type data packet, the second-type data packet, and the third-type data packet includes a data packet from an adaptation layer entity of the wireless backhaul node and/or a data packet from a radio link control layer entity of the wireless backhaul node; the first-type data packet can be transmitted through a first next-hop node in the plurality of next-hop nodes and a second next-hop node in the plurality of next-hop nodes; the second-type data packet can be transmitted only through the first next-hop node in the plurality of next-hop nodes; and the third-type data packet can be transmitted only through the second next-hop node in the plurality of next-hop nodes.

In one embodiment, the wireless backhaul node has the plurality of next-hop nodes (e.g., parent nodes) on the uplink, and the plurality of next-hop nodes include the first next-hop node and the second next-hop node. Therefore, an uplink data packet from a terminal device may be used as a data packet to be sent by the wireless backhaul node, and transmission of the uplink data packet from the terminal device to a donor node may correspond to a plurality of transmission paths. The next-hop node is a node directly connected to the wireless backhaul node, and "a plurality of" herein may mean two or more. In addition, "transmission" in an embodiment of the application refers to transmission of an uplink data packet, that is, the uplink data packet is transmitted from the wireless backhaul node to the donor node.

It should be understood that, uplink transmission of the terminal device may be scheduled by a node providing an access service for the terminal device. Similarly, uplink transmission of the wireless backhaul node may be scheduled and allocated an uplink scheduling resource by a parent node of the wireless backhaul node. Therefore, the wireless backhaul node may feed back a data volume of the to-be-sent data packet to the parent node of the wireless backhaul node. If the wireless backhaul node feeds back the data volume of the to-be-sent data packet to the first next-hop node, the first next-hop node may allocate an uplink scheduling resource to the wireless backhaul node, to schedule the wireless backhaul node to perform data transmission. If the wireless backhaul node feeds back the data volume of the to-be-sent data packet to the second next-hop node, the second next-hop node may allocate an uplink scheduling resource to the wireless backhaul node, to schedule the wireless backhaul node to perform data transmission.

In other words, in an IAB network, data transmission may be scheduled hop by hop, and a corresponding data volume may also be reported hop by hop. For example, as shown in FIG. 1, the IAB node C reports an uplink data volume to the IAB node A and expects to be scheduled by the IAB node A. After receiving a data packet sent by the IAB node C, the IAB node A reports the uplink data volume to the donor node and expects to be scheduled by the donor node.

It should be further understood that, for an uplink data volume reported by the wireless backhaul node, the wireless backhaul node expects to send a data packet of the uplink data volume by using an uplink scheduling resource of the parent node of the wireless backhaul node, but the parent node of the wireless backhaul node may not necessarily meet a requirement of the wireless backhaul node, that is, the parent node may schedule a data volume of a data packet sent by the wireless backhaul node to be less than the data volume reported by the wireless backhaul node. This is not limited in an embodiment of the application.

In the application, a parent node that is of the wireless backhaul node and that receives the data volume of the to-be-sent data packet fed back by the wireless backhaul node is referred to as a reporting node. The parent node of the wireless backhaul node may be another wireless backhaul node, or may be a donor node. Therefore, the reporting node may be another wireless backhaul node, or may be a donor node. If the wireless backhaul node selects the first next-hop node as the reporting node, it indicates that the wireless backhaul node expects to transmit the to-be-sent data packet through the first next-hop node. If the wireless backhaul node selects the second next-hop node as the reporting node, it indicates that the wireless backhaul node expects to transmit the to-be-sent data packet through the second next-hop node.

Optionally, when the donor node is in a form in which a CU is separated from a DU, the reporting node may alternatively be the distributed unit DU of the donor node. This is not limited in an embodiment of the application.

The wireless backhaul node may receive uplink data packets from the terminal device (which may be a plurality of different terminal devices). Different types of data packets in the uplink data packets have different transmission requirements, for example, the uplink data packets may include both a data packet with a specified path and bearer and a flexibly routed data packet. Because the wireless backhaul node has two next-hop nodes on the uplink, in an embodiment of the application, the uplink data packets from the terminal device are classified into three types: a first-type data packet, a second-type data packet, and a third-type data packet. The first-type data packet can be transmitted through both the first next-hop node and the second next-hop node. The second-type data packet can be transmitted only through the first next-hop node. The third-type data packet can be transmitted only through the second next-hop node. In an embodiment of the application, the first-type data packet may be referred to as a "data packet that can be flexibly routed", and correspondingly, the second-type data packet and the third-type data packet may be referred to as "data packets that cannot be flexibly routed". The data volume of the first-type data packet may be greater than or equal to 0, and the data volume of the second-type data packet may also be greater than or equal to 0.

Because the second-type data packet can be transmitted only through the first next-hop node, a reporting node for the data volume of the second-type data packet is the first next-hop node. Because the third-type data packet can be transmitted only through the second next-hop node, a reporting node for the data volume of the third-type data packet is the second next-hop node. For the first-type data packet, the wireless backhaul node may determine the one or more reporting nodes for the data volume of the first-type data packet from the plurality of next-hop nodes based on the data volume of the first-type data packet, the data volume of the second-type data packet, and the data volume of the third-type data packet. In an embodiment of the application, the one or more reporting nodes may be the first next-hop node, or may be the second next-hop node, or may include both the first next-hop node and the second next-hop node.

In addition, there may be different deployment cases of a protocol stack of the wireless backhaul node. For example, an adaptation layer of the wireless backhaul node is located above an RLC layer of the wireless backhaul node, or an adaptation layer of the wireless backhaul node is located between an RLC layer and a MAC layer of the wireless backhaul node. For another example, a buffer may or may not be configured for an adaptation layer of the wireless backhaul node. Therefore, at least one of the first-type data packet, the second-type data packet, and the third-type data packet may include the data packet from the adaptation layer entity of the wireless backhaul node and/or the data packet from the RLC layer entity of the wireless backhaul node.

After the wireless backhaul node determines the one or more reporting nodes for the data volume of the first-type data packet, the wireless backhaul node may notify the one or more reporting nodes of the data volume, for example, send the buffer status report (BSR), to indicate the data volume of the first-type data packet. It should be understood that, in an embodiment of the application, the wireless backhaul node may directly send the data volume of the first-type data packet in the BSR, or may send, in the BSR, indication information used to indicate the data volume of the first-type data packet. This is not limited in an embodiment of the application. It should be further understood that, in addition to indicating the data volume of the first-type data packet, the BSR may further indicate a data volume of another type of data packet. This is not limited in an embodiment of the application either.

According to the data transmission method used in a wireless backhaul network in an embodiment of the application, the wireless backhaul node selects, for a data packet that can be flexibly routed (e.g., the first-type data packet), a reporting node from the plurality of next-hop nodes of the wireless backhaul node on the uplink based on data volumes of different types of data packets, and sends, to the reporting node, a buffer status report used to indicate a data volume of such a data packet that can be flexibly routed, so that such a data packet can be transmitted through the reporting node, thereby performing uplink offloading by properly using a plurality of links. This helps improve uplink data transmission efficiency.

It should be understood that the wireless backhaul node in the foregoing method 200 may correspond to the IAB node C in FIG. 1, and the IAB node C has a first next-hop node (the IAB node A) and a second next-hop node (the IAB node B). However, this is not limited in an embodiment of the application.

In an embodiment of the application, the wireless backhaul node may determine the one or more reporting nodes for the data volume of the first-type data packet in a plurality of manners.

In an optional embodiment, when a sum of the data volume of the first-type data packet, the data volume of the second-type data packet, and the data volume of the third-type data packet is greater than or equal to a first threshold, the one or more reporting nodes are the first next-hop node and the second next-hop node.

In one embodiment, if the sum of the data volume of the first-type data packet, the data volume of the second-type data packet, and the data volume of the third-type data packet is greater than or equal to the first threshold, it indicates that a data volume of a to-be-transmitted data packet is relatively large. The reason is as follows. The second-type data packet is transmitted through a link corresponding to the first next-hop node, the third-type data packet is transmitted through a link corresponding to the second next-hop node, and the first-type data packet is transmitted through only one link. This may cause uplink load on a link between the wireless backhaul node and one of the next-hop nodes of the wireless backhaul node to be excessively heavy. In this case, the wireless backhaul node may report the data volume of the first-type data packet to both the first next-hop node and the second next-hop node.

The first next-hop node and the second next-hop node each can allocate, to the wireless backhaul node, an uplink scheduling resource corresponding to the data volume of the first-type data packet, or some uplink scheduling resources may be allocated to the wireless backhaul node through coordination of the donor node or through coordination between the first next-hop node and the second next-hop node. This is not limited in an embodiment of the application. It is assumed that the data volume of the first-type data packet is 70, the data volume of the second-type data packet is 20, and the data volume of the third-type data packet is 50. In a possible implementation, the first next-hop node may allocate an uplink scheduling resource to the wireless backhaul node, so that the wireless backhaul node can transmit a part that is of the first data packet and whose data volume is 50, and the second next-hop node may allocate an uplink scheduling resource to the wireless backhaul node, so that the wireless backhaul node can transmit the other part that is of the first data packet and whose data volume is 20. In another possible implementation, the first next-hop node may allocate an uplink scheduling resource to the wireless backhaul node, so that the wireless backhaul node can transmit the entire first data packet (the data volume is 70), or the second next-hop node may allocate an uplink scheduling resource to the wireless backhaul node, so that the wireless backhaul node can transmit the entire first data packet (the data volume is 70).

In an optional embodiment, the method further includes: the wireless backhaul node receives first configuration information from the donor node, where the first configuration information is used to indicate the first threshold.

The first threshold may be configured by the donor node for the wireless backhaul node by using the first configuration information, or may be agreed on in a protocol. This is not limited in an embodiment of the application.

In an optional embodiment, when the sum of the data volume of the first-type data packet, the data volume of the second-type data packet, and the data volume of the third-type data packet is less than a second threshold, the one or more reporting nodes are one of the first next-hop node and the second next-hop node.

In one embodiment, if the sum of the data volume of the first-type data packet, the data volume of the second-type data packet, and the data volume of the third-type data packet is less than the second threshold, it indicates that the data volume of the to-be-transmitted data packet is relatively small, and burden is not caused to a node when the first-type data packet is transmitted through one path. In this case, the wireless backhaul node may select one of the first next-hop node and the second next-hop node as the reporting node, that is, transmit the first-type data packet through one of the first next-hop node and the second next-hop node.

Optionally, when only one next-hop node needs to be selected as the reporting node, the wireless backhaul node may select one default node as the reporting node. The default node may be the first next-hop node, or may be the second next-hop node, and is agreed on in a communication protocol or configured by the donor node. This is not limited in an embodiment of the application.

In an optional embodiment, the method further includes: the wireless backhaul node receives second configuration information from the donor node, where the second configuration information is used to indicate the second threshold.

The second threshold may be configured by the donor node for the wireless backhaul node by using the second configuration information, or may be agreed on in a protocol. This is not limited in an embodiment of the application.

Optionally, the first configuration information and the second configuration information may be a same piece of configuration information. Optionally, the first threshold is equal to the second threshold. In this case, the donor node may configure one threshold for the wireless backhaul node by using one piece of configuration information.

In another possible implementation of the application, when the sum of the data volume of the first-type data packet, the data volume of the second-type data packet, and the data volume of the third-type data packet is greater than the first threshold, the one or more reporting nodes are the first next-hop node and the second next-hop node. When the sum of the data volume of the first-type data packet, the data volume of the second-type data packet, and the data volume of the third-type data packet is less than or equal to the second threshold, the one or more reporting nodes are one of the first next-hop node and the second next-hop node. The first threshold may be equal to the second threshold.

In an embodiment of the application, a combination of "greater than or equal to" and "less than" may be used as a determining condition for selecting a reporting node, or a combination of "greater than" and "less than or equal to" may be used as a determining condition for selecting a reporting node. For ease of description, the combination of "greater than or equal to" and "less than" is merely used as an example for description in subsequent embodiments of the application. However, it should be understood that this is not limited in an embodiment of the application, and the combination of "greater than" and "less than or equal to" also falls within the protection scope of the application.

In an optional embodiment, when a sum of the data volume of the first-type data packet and the data volume of the second-type data packet is less than a third threshold, and a sum of the data volume of the first-type data packet and the data volume of the third-type data packet is greater than or equal to a fourth threshold, the one or more reporting nodes are the first next-hop node.

In one embodiment, the second-type data packet is transmitted through the link corresponding to the first next-hop node, and the third-type data packet is transmitted through the link corresponding to the second next-hop node. If the sum of the data volume of the first-type data packet and the data volume of the second-type data packet is less than the third threshold, and the sum of the data volume of the first-type data packet and the data volume of the third-type data packet is greater than or equal to the fourth threshold, it indicates that uplink load on a link between the wireless backhaul node and the first next-hop node is lighter than uplink load on a link between the wireless backhaul node and the second next-hop node, and the wireless backhaul node may expect to transmit the first-type data packet through the first next-hop node. Therefore, the wireless backhaul node may determine the first next-hop node as the reporting node, and report the data volume of the first-type data packet to the first next-hop node.

In an optional embodiment, the method further includes: the wireless backhaul node receives third configuration information from the donor node, where the third configuration information is used to indicate the third threshold and the fourth threshold.

The third threshold and the fourth threshold may be configured by the donor node for the wireless backhaul node by using the third configuration information, or may be agreed on in a protocol. This is not limited in an embodiment of the application. It should be understood that the third threshold represents an uplink transmission capability of the link between the wireless backhaul node and the first next-hop node to some extent, and the fourth threshold represents an uplink transmission capability of the link between the wireless backhaul node and the second next-hop node to some extent.

In an optional embodiment, when the sum of the data volume of the first-type data packet and the data volume of the second-type data packet is greater than or equal to a fifth threshold, and the sum of the data volume of the first-type data packet and the data volume of the third-type data packet is less than a sixth threshold, the one or more reporting nodes are the second next-hop node.

In one embodiment, the second-type data packet is transmitted through the link corresponding to the first next-hop node, and the third-type data packet is transmitted through the link corresponding to the second next-hop node. If the sum of the data volume of the first-type data packet and the data volume of the second-type data packet is greater than or equal to the fifth threshold, and the sum of the data volume of the first-type data packet and the data volume of the third-type data packet is less than the sixth threshold, it indicates that uplink load on the link between the wireless backhaul node and the second next-hop node is lighter than uplink load on the link between the wireless backhaul node and the first next-hop node, and the wireless backhaul node may expect to transmit the first-type data packet through the second next-hop node. Therefore, the wireless backhaul node may determine the second next-hop node as the reporting node, and report the data volume of the first-type data packet of the second next-hop node.

In an optional embodiment, the method further includes: the wireless backhaul node receives fourth configuration information from the donor node, where the fourth configuration information is used to indicate the fifth threshold and the sixth threshold.

The fifth threshold and the sixth threshold may be configured by the donor node for the wireless backhaul node by using the fourth configuration information, or may be agreed on in a protocol. This is not limited in an embodiment of the application. It should be understood that the fifth threshold represents an uplink transmission capability of the link between the wireless backhaul node and the first next-hop node to some extent, and the sixth threshold represents an uplink transmission capability of the link between the wireless backhaul node and the second next-hop node to some extent.

In an optional embodiment, when the sum of the data volume of the first-type data packet and the data volume of the second-type data packet is less than a seventh threshold, and the sum of the data volume of the first-type data packet and the data volume of the third-type data packet is less than an eighth threshold, the one or more reporting nodes are one of the first next-hop node and the second next-hop node.

In one embodiment, the second-type data packet is transmitted through the link corresponding to the first next-hop node, and the third-type data packet is transmitted through the link corresponding to the second next-hop node. If the sum of the data volume of the first-type data packet and the data volume of the second-type data packet is less than the seventh threshold, and the sum of the data volume of the first-type data packet and the data volume of the third-type data packet is less than the eighth threshold, it indicates that uplink load on the link between the wireless backhaul node and the second next-hop node and uplink load on the link between the wireless backhaul node and the first next-hop node are both relatively light. The wireless backhaul node may determine either of the first next-hop node and the second next-hop node as the reporting node, and report the data volume of the first-type data packet to the reporting node.

Optionally, when only one next-hop node needs to be selected as the reporting node, the wireless backhaul node may select a better node from the first next-hop node and the second next-hop node as the reporting node. The better node may be the first next-hop node, or may be the second next-hop node, and is agreed on in a protocol or configured by the donor node. This is not limited in an embodiment of the application.

In an optional embodiment, the method further includes: the wireless backhaul node receives fifth configuration information from the donor node, where the fifth configuration information is used to indicate the seventh threshold and the eighth threshold.

The seventh threshold and the eighth threshold may be configured by the donor node for the wireless backhaul node by using the fifth configuration information, or may be agreed on in a protocol. This is not limited in an embodiment of the application. It should be understood that the seventh threshold represents an uplink transmission capability of the link between the wireless backhaul node and the first next-hop node to some extent, and the eighth threshold represents an uplink transmission capability of the link between the wireless backhaul node and the second next-hop node to some extent.

In an optional embodiment, when the sum of the data volume of the first-type data packet and the data volume of the second-type data packet is greater than or equal to a ninth threshold, and the sum of the data volume of the first-type data packet and the data volume of the third-type data packet is greater than or equal to a tenth threshold, the one or more reporting nodes are the first next-hop node and the second next-hop node.

In one embodiment, if the sum of the data volume of the first-type data packet and the data volume of the second-type data packet is greater than or equal to the ninth threshold, and the sum of the data volume of the first-type data packet and the data volume of the third-type data packet is greater than or equal to the ninth threshold, it indicates that uplink load on the link between the wireless backhaul node and the second next-hop node and uplink load on the link between the wireless backhaul node and the first next-hop node are both relatively heavy. The wireless backhaul node may determine the first next-hop node and the second next-hop node as the reporting nodes, and report the data volume of the first-type data packet to both the first next-hop node and the second next-hop node. The first next-hop node and the second next-hop node each can allocate, to the wireless backhaul node, an uplink scheduling resource corresponding to the data volume of the first-type data packet, or some uplink scheduling resources may be allocated to the wireless backhaul node through coordination of the donor node or through coordination between the first next-hop node and the second next-hop node. This is not limited in an embodiment of the application.

In an optional embodiment, the method further includes: the wireless backhaul node receives sixth configuration information from the donor node, where the fifth configuration information is used to indicate the ninth threshold and the tenth threshold.

The ninth threshold and the tenth threshold may be configured by the donor node for the wireless backhaul node by using the sixth configuration information, or may be agreed on in a protocol. This is not limited in an embodiment of the application. It should be understood that the ninth threshold represents an uplink transmission capability of the link between the wireless backhaul node and the first next-hop node to some extent, and the tenth threshold represents an uplink transmission capability of the link between the wireless backhaul node and the second next-hop node to some extent.

Optionally, the third configuration information, the fourth configuration information, the fifth configuration information, and the sixth configuration information may be a same piece of configuration information. Optionally, at least two of the third threshold, the fifth threshold, the seventh threshold, and the ninth threshold are the same, and at least two of the fourth threshold, the sixth threshold, the eighth threshold, and the tenth threshold are the same. If the third threshold, the fifth threshold, the seventh threshold, and the ninth threshold are all the same, and the fourth threshold, the sixth threshold, the eighth threshold, and the tenth threshold are all the same, the donor node may configure two of the foregoing thresholds for the wireless backhaul node by using one piece of configuration information.

In an optional embodiment, at least one of the first-type data packet, the second-type data packet, and the third-type data packet further includes a data packet from a packet data convergence protocol layer entity of the wireless backhaul node.

In one embodiment, at least one of the first-type data packet, the second-type data packet, and the third-type data packet may further include the data packet from the packet data convergence protocol (PDCP) layer entity of the wireless backhaul node. In this case, the wireless backhaul node may serve as a mobile terminal (mobile termination, MT) (a hypothetical terminal device), and a service of the wireless backhaul node is transmitted through the parent node of the wireless backhaul node.

In an optional embodiment, the adaptation layer of the wireless backhaul node is located between the radio link control layer of the wireless backhaul node and the media access control layer of the wireless backhaul node.

The method further includes:

The wireless backhaul node sends at least one of the first-type data packet, the second-type data packet, or the third-type data packet to the first next-hop node and/or the second next-hop node in a first routing mode or a second routing mode in a hop-by-hop automatic repeat request mode or a hop-by-hop reassembly mode.

In the first routing mode, different data packets from a same radio link control layer entity need to be routed to a same next-hop node in the plurality of next-hop nodes; and in the second routing mode, different data packets from a same radio link control layer entity can be routed to different next-hop nodes in the plurality of next-hop nodes, but different segments of a same data packet need to be routed to a same next-hop node in the plurality of next-hop nodes.

In one embodiment, when the adaptation layer of the wireless backhaul node is located between the RLC layer and the MAC layer, and the wireless backhaul node uses the hop-by-hop ARQ mode or the hop-by-hop reassembly mode, the wireless backhaul node may perform routing restriction on a to-be-sent data packet, thereby ensuring that different segments of one data packet at the RLC layer of the wireless backhaul node are sent to a same next-hop node. The different data packets are different RLC SDUs. For example, to-be-sent data packets may be numbered at the RLC layer, and the different data packets are data packets with different RLC layer numbers. The wireless backhaul node may implement the foregoing routing restriction in two routing manners:

1. In a first routing mode, it is limited that only one peer entity of one RLC layer entity is located on a next-hop node for each wireless backhaul node, thereby ensuring that different data packets from a same RLC layer entity of the wireless backhaul node are routed to a same next-hop node.

2. In a second routing mode, it is limited that different data packets of a same RLC layer entity of the wireless backhaul node are transmitted through different paths, but different segments (segment) of a same data packet need to be routed to a same next-hop node.

If the hop-by-hop ARQ mode is used, a node at each hop on a transmission path can reassemble segments of a data packet and detect whether the data packet is correctly received, to feed back an ACK or a NACK to a previous-hop node. In an embodiment of the application, routing restriction is performed on the wireless backhaul node, so that it can be ensured that different segments of one RLC layer SDU of the wireless backhaul node are sent by the wireless backhaul node to a same next-hop node, thereby avoiding a data transmission failure that is caused because different segments of a same RLC SDU are transmitted through different paths and these segments cannot be reassembled by a next-hop node to restore a correct data packet.

Alternatively, if the hop-by-hop reassembly mode is used, a node at each hop on a transmission path can reassemble segments of a data packet. In an embodiment of the application, routing restriction is performed on the wireless backhaul node, so that it can be ensured that different segments of one RLC SDU are sent by the wireless backhaul node to a same next-hop node, thereby avoiding a case in which different segments of a same RLC SDU are transmitted through different paths and consequently these segments cannot be reassembled by a next-hop node to restore a correct data packet.

The application further provides a data transmission method used in a wireless backhaul network. The wireless backhaul network includes a wireless backhaul node, the wireless backhaul node has a plurality of next-hop nodes, and an adaptation layer of the wireless backhaul node is located between a radio link control layer of the wireless backhaul node and a media access control layer of the wireless backhaul node. The method includes:

The wireless backhaul node sends a data packet to a next-hop node in the plurality of next-hop nodes in a first routing mode or a second routing mode in a hop-by-hop automatic repeat request mode or a hop-by-hop reassembly mode.

In the first routing mode, different data packets from a same radio link control layer entity need to be routed to a same next-hop node in the plurality of next-hop nodes; and in the second routing mode, different data packets from a same radio link control layer entity can be routed to different next-hop nodes in the plurality of next-hop nodes, but different segments of a same data packet need to be routed to a same next-hop node in the plurality of next-hop nodes.

It should be understood that the plurality of next-hop nodes herein may be next-hop nodes on an uplink, or may be next-hop nodes on a downlink. This is not limited in an embodiment of the application.

In an embodiment of the application, routing restriction is performed on the wireless backhaul node, so that it can be ensured that different segments of one data packet at the RLC layer of the wireless backhaul node are sent to a same next-hop node, thereby avoiding a data transmission failure that is caused because different segments are transmitted through different paths and a neighboring node cannot restore a correct data packet through reassembly.

With reference to FIG. 3 to FIG. 7, the following describes in detail the data transmission method used in a wireless backhaul network in the application by using an example in which the terminal device is UE 1, the wireless backhaul node is an IAB node C, the first next-hop node is an IAB node A, and the second next-hop node is an IAB node B.

FIG. 3 is a diagram of a user plane protocol stack architecture according to an embodiment of the application. The UE 1 includes a service data adaptation protocol (SDAP) layer, a packet data convergence protocol (PDCP) layer, a radio link control (RLC) layer, a media access control (medium access control, MAC) layer, and a physical (PHY) layer. A donor node includes protocol layers that are peer to the PDCP layer and the SDAP layer of the UE 1. The donor node shown in FIG. 3 is in a form in which a CU is separated from a DU, and the protocol layers that are peer to the PDCP layer and the SDAP layer of the UE 1 are located on the donor CU of the donor node. Optionally, when the donor CU is in a form in which a user plane (UP) is separated from a control plane (CP), the protocol layers that are peer to the PDCP layer and the SDAP layer of the UE 1 are located on the CU-UP of the donor node.

In protocol layers on a backhaul link shown in FIG. 3, the IAB node and the donor node each include an adaptation layer, an RLC layer, a MAC layer, and a PHY layer successively from top to bottom. The adaptation layer may be configured to perform data packet routing and QoS mapping. The data packet routing is used to determine a next-hop node, and the QoS mapping is used to determine a radio bearer (or an RLC bearer, or an RLC channel, or a logical channel (LCH)) of a backhaul link of a to-be-sent data packet. In FIG. 3, a radio bearer and an RLC channel (or an RLC bearer) may be in a one-to-one correspondence, or may be in a many-to-one correspondence, and the RLC channel (or the RLC bearer) and an LCH are in a one-to-one correspondence. The adaptation layer may carry any one or more of the following information: information used for data packet routing (for example, an identifier of the UE, an identifier of the donor node, and an identifier of the IAB node), information used for QoS mapping (for example, an identifier of a UE radio bearer), data packet type indication information (for example, indication information for distinguishing user plane data, an RRC message, and an F1AP message), flow control feedback information, and the like. It should be understood that a function of the adaptation layer may alternatively be extended based on a function of any protocol layer (for example, the RLC layer, the MAC layer, or the PDCP layer) or functions of any plurality of protocol layers at an existing layer 2, and no additional protocol layer is required.

Because the donor node is in the form in which the CU is separated from the DU, the CU and the DU are connected through an F1 interface. A user plane protocol of the F1 interface includes a GPRS tunneling protocol (GTP) layer, a user datagram protocol (UDP) layer, an Internet protocol (IP) layer, an L2 layer, and an L1 layer. The L1 layer and the L2 layer generally refer to protocol layers in wired communications, and depend on a specific connection technology used between the DU and the CU. For example, the L1 layer may be a physical layer, the L2 layer may be a data link layer, and the L2 layer may further include at least one of a MAC layer, a logical link control layer (LLC), a point-to-point protocol (PPP) layer, and a link layer of an Ethernet technology. Specific protocol layers included in the L1 layer and the L2 layer are not limited in the embodiments of the application Based on a protocol stack shown in FIG. 3, in the communications system shown in FIG. 1, the IAB node C is used as an example. The IAB node C has the two next-hop nodes on the uplink, that is, the IAB node A and the IAB node B. Therefore, uplink data of the IAB node C can be transmitted through both the IAB node A and the IAB node B. For such a protocol stack, a granularity (which may refer to a quantity of adaptation layer entities) of the adaptation layer of the IAB node may include the following plurality of possibilities:

1. an IAB node granularity, where the IAB node has only one adaptation layer entity, and the adaptation layer entity corresponds to a plurality of RLC channels (or RLC bearers) of the IAB node;

2. an IAB RLC bearer granularity, where the IAB node has a plurality of adaptation layer entities, and each of the plurality of adaptation layer entities corresponds to one RLC channel (or RLC bearer);

3. a backhaul link granularity or a MAC layer entity granularity, where each MAC layer entity of the IAB node corresponds to one adaptation layer entity;

4. a UE bearer granularity, where the IAB node has a plurality of adaptation layer entities, and each of the plurality of adaptation layer entities is in a one-to-one correspondence with a UE bearer on which data is transmitted through the IAB node; and 5. granularities varying with different function blocks of the adaptation layer, where for example, a routing function block is at an IAB node granularity, and a function block for the QoS mapping part is at a backhaul link granularity or a MAC layer entity granularity.

In consideration of flexibility of data transmission, the granularity of the adaptation layer in the fifth possibility is used for description in the embodiments of the application. Based on different scenarios such as whether a buffer is set at the adaptation layer and a quantity of preconfigured thresholds, the embodiments of the application may be classified into the following possible cases:

1. No buffer is set at the adaptation layer, and no threshold (the threshold refers in particular to a threshold used by the IAB node C to determine a reporting node) is configured.

After performing corresponding adaptation-layer function processing (for example, routing and QoS mapping decision-making) at the adaptation layer, the IAB node C places an uplink data packet in an RLC entity corresponding to an IAB RLC channel, that is, an uplink offloading decision is made by the IAB node C. In this case, because the uplink IAB RLC channel of the IAB node C corresponds to a parent node of the IAB node C, when the IAB node C collects statistics about an uplink data volume, the IAB node C may collect statistics about a volume of data in a buffer of the RLC layer entity, and can report a data volume of each RLC entity only to a specific parent node corresponding to the RLC entity.

2. A buffer is set at the adaptation layer, and a threshold (TH) is preconfigured.

The buffer is set at the adaptation layer of the IAB node C, the threshold TH is configured, and TH is greater than or equal to 0. Data packets located in the buffer at the adaptation layer of the IAB node C may include three types of data packets, that is, the first-type data packet, the second-type data packet, and the third-type data packet in the foregoing method 200. The data volume of the first-type data packet is $V_C$, the data volume of the second-type data packet is $V_A$, and the data volume of the third-type data packet is $V_B$.

It should be understood that, in the embodiments of the application, the data packet in the buffer at the adaptation layer may be a to-be-sent data packet located at the adaptation layer of the IAB node C, and includes any one or more of the following: an SDU at the adaptation layer, a PDU that is at the adaptation layer and that has not been delivered to a lower protocol layer, a status report (which may include information such as a buffer status and a data packet sending status) at the adaptation layer, a PDU that is at the adaptation layer and that is to be retransmitted, and the like. This is not limited in the embodiments of the application.

When $V_A+V_B+V_C \geq TH$, the IAB node C reports the data volume of $V_C$ to both the two parent nodes: the IAB node A and the IAB node B; otherwise, the IAB node C reports the data volume of $V_C$ only to a specified parent node (the IAB node A or the IAB node B).

In another possible implementation, optionally, $V_{Aj}$ indicates a data volume of a data packet that is in the data packets located in the buffer at the adaptation layer of the IAB node C and that can be sent to the IAB node A only through a bearer j; $V_{Bk}$ indicates a data volume of a data packet that is in the data packets located in the buffer at the adaptation layer of the IAB node C and that can be sent to the IAB node B only through a bearer k; and $V_C$ indicates a data volume of a data packet that is in the data packets located in the buffer at the adaptation layer of the IAB node C and that can not only be sent to A through the bearer j but also can be sent to B through the bearer k. The bearer j herein may alternatively be an RLC channel whose identifier is j, or an RLC bearer whose identifier is j, or an LCH whose identifier is j. The bearer k is similar to the bearer j. This is not limited herein.

When $V_{Aj}+V_{Bk}+V_C \geq TH$, the IAB node C reports the data volume of $V_C$ to both the two parent nodes: the IAB node A and the IAB node B; otherwise, the IAB node C reports the data volume of $V_C$ only to a specified parent node (the IAB node A or the IAB node B).

In another possible implementation, further, $V_{Rj}$ indicates a volume of to-be-sent data in an RLC layer entity corresponding to a bearer j, and $V_{Rk}$ indicates a volume of to-be-sent data in an RLC layer entity corresponding to a bearer k.

When $V_{Aj}+V_{Bk}+V_C+V_{Rj}+V_{Rk} \geq TH$, the IAB node C reports the data volume of $V_C$ to both the two parent nodes: the IAB node A and the IAB node B; otherwise, the IAB node C reports the data volume of $V_C$ only to a specified parent node (the IAB node A or the IAB node B).

It should be understood that, in the embodiments of the application, data volumes of to-be-sent data packets included in the RLC layer entity may include a total data volume of to-be-sent RLC SDUs and RLC PDUs. These to-be-sent data packets (e.g., RLC SDUs, RLC PDUs, or both RLC PDUs and RLC SDUs) may include an RLC SDU and an RLC SDU segment that have not been encapsulated into an RLC PDU, an RLC PDU to be transmitted for the first time, an RLC PDU to be retransmitted, and the like. This is not limited in the embodiments of the application.

3. A buffer is set at the adaptation layer, and two thresholds ($TH_A$ and $TH_B$) are preconfigured.

The buffer is set at the adaptation layer of the IAB node C, the thresholds $TH_A$ and $TH_B$ are configured, and both $TH_A$ and $TH_B$ are greater than or equal to 0. Data packets located in the buffer at the adaptation layer of the IAB node C may include three types of data packets, that is, the first-type data packet, the second-type data packet, and the third-type data packet in the foregoing method 200. The data volume of the first-type data packet is $V_C$, the data volume of the second-type data packet is $V_A$, and the data volume of the third-type data packet is $V_B$.

If $V_A+V_C<TH_A$ and $V_B+V_C \geq TH_B$, the IAB node C reports the data volume of $V_C$ to the IAB node A.

If $V_A+V_C \geq TH_A$ and $V_B+V_C<TH_B$, the IAB node C reports the data volume of $V_C$ to the IAB node B.

If $V_A+V_C<TH_A$ and $V_B+V_C<TH_B$, the IAB node C reports the data volume of $V_C$ to one of the IAB node A and the IAB node B.

If $V_A+V_C \geq TH_A$ and $V_B+V_C \geq TH_B$, the IAB node C reports the data volume of $V_C$ to both the IAB node A and the IAB node B.

In another possible implementation, optionally, $V_{Aj}$ indicates a data volume of a data packet that is in the data packets located in the buffer at the adaptation layer of the IAB node C and that can be sent to the IAB node A only through a bearer j; $V_{Bk}$ indicates a data volume of a data packet that is in the data packets located in the buffer at the adaptation layer of the IAB node C and that can be sent to the IAB node B only through a bearer k; and $V_C$ indicates a data volume of a data packet that is in the data packets located in the buffer at the adaptation layer of the IAB node C and that can not only be sent to A through the bearer j but also can be sent to B through the bearer k. The bearer j herein may alternatively be an RLC channel whose identifier is j, or an RLC bearer whose identifier is j, or an LCH whose identifier is j. The bearer k is similar to the bearer j. This is not limited herein.

If $V_{Aj}+V_C<TH_A$ and $V_{Bk}+V_C \geq TH_B$, the IAB node C reports the data volume of $V_C$ to the IAB node A.

If $V_{Aj}+V_C \geq TH_A$ and $V_{Bk}+V_C<TH_B$, the IAB node C reports the data volume of $V_C$ to the IAB node B.

If $V_{Aj}+V_C<TH_A$ and $V_{Bk}+V_C<TH_B$, the IAB node C reports the data volume of $V_C$ to one of the IAB node A and the IAB node B.

If $V_{Aj}+V_C \geq TH_A$ and $V_{Bk}+V_C \geq TH_B$, the IAB node C reports the data volume of $V_C$ to both the IAB node A and the IAB node B.

In another possible implementation, further, $V_{Rj}$ indicates a volume of to-be-sent data in an RLC layer entity corresponding to a bearer j, and $V_{Rk}$ indicates a volume of to-be-sent data in an RLC layer entity corresponding to a bearer k.

If $V_{Aj}+V_C+V_{Rj}<TH_A$ and $V_{Bk}+V_C+V_{Rk} \geq TH_B$, the IAB node C reports the data volume of $V_C$ to the IAB node A.

If $V_{Aj}+V_C+V_{Rj} \geq TH_A$ and $V_{Bk}+V_C+V_{Rk}<TH_B$, the IAB node C reports the data volume of $V_C$ to the IAB node B.

If $V_{Aj}+V_C+V_{Rj}<TH_A$ and $V_{Bk}+V_C+V_{Rk}<TH_B$, the IAB node C reports the data volume of $V_C$ to one of the IAB node A and the IAB node B.

If $V_{Aj}+V_C+V_{Rj} \geq TH_A$ and $V_{Bk}+V_C+V_{Rk} \geq TH_B$, the IAB node C reports the data volume of $V_C$ to both the IAB node A and the IAB node B.

It should be understood that, the data packet of the data volume of $V_C$ may further include data of a PDCP layer entity of the IAB node C. Further, the PDCP entity may be a PDCP entity corresponding to the bearer j and the bearer k when the IAB node C serves as a mobile terminal MT.

It should be further understood that, to some extent, the threshold $TH_A$ and the threshold $TH_B$ respectively reflect uplink transmission capabilities of links from the IAB node C to the two parent nodes: the IAB node A and the IAB node B.

In the embodiments of the application, a threshold for determining reporting by the IAB node C and a specified parent node when a common part, namely, the data volume C is reported to only one node may be configured by the donor node (the CU of the donor node or the CU-CP part of the donor node) for the IAB node C. In one embodiment, the donor node may configure the foregoing information for the IAB node C by using an F1 application protocol (F1AP) message or a radio resource control (RRC) message.

According to the data transmission method used in a wireless backhaul network in the embodiments of the application, the wireless backhaul node selects, for a data packet that can be flexibly routed, a reporting node from the plurality of next-hop nodes of the wireless backhaul node on the uplink based on data volumes of different types of data packets, and sends, to the reporting node, a buffer status report used to indicate a data volume of such a data packet that can be flexibly routed, so that such a data packet can be transmitted through the reporting node, thereby performing uplink offloading by properly using a plurality of links. This helps improve uplink data transmission efficiency.

Figure 4:
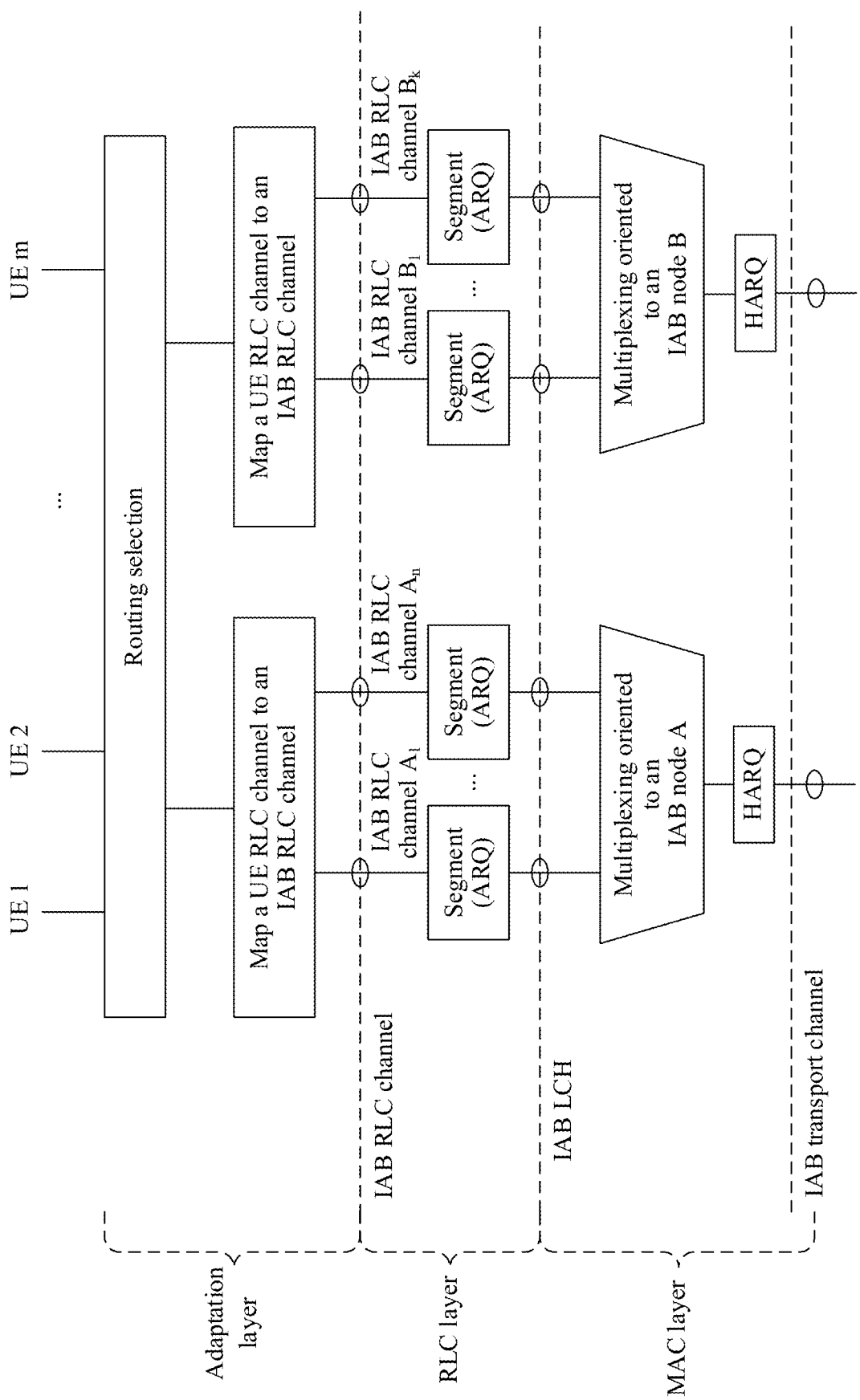
FIG. 4 is a schematic diagram of a layer 2 architecture when a wireless backhaul node serves as a transmit side according to an embodiment of the application.

Corresponding to the protocol stack architecture shown in FIG. 3, FIG. 4 is a schematic diagram of a layer 2 architecture (L2 structure) when the wireless backhaul node shown in FIG. 3 serves as a transmit side according to an embodiment of the application. The IAB node C in an embodiment is used as an example. The IAB node C may receive data packets from a plurality of UEs, for example, UE 1, UE 2, . . . , and UE m, where m is a positive integer. The IAB node C may perform routing selection at the adaptation layer, and a result of the routing selection may be selecting the IAB node A as a next-hop node, or selecting the IAB node B as a next-hop node. The IAB node C may further perform QoS mapping at the adaptation layer, to map an RLC channel of the UE to an IAB RLC channel. It should be understood that, a channel between the adaptation layer and the RLC layer may be referred to as an IAB RLC channel (or an RLC channel of a backhaul link); a channel between the RLC layer and the MAC layer may be referred to as an IAB LCH (or an LCH of the backhaul link); and a channel between the MAC layer and the PHY layer may be referred to as an IAB transport channel (or a transport channel of the backhaul link). As shown in FIG. 3, RLC channels of the IAB node C may include an IAB RLC channel $A_1$, . . . , and an IAB RLC channel $A_n$ that are in a one-to-one correspondence with RLC entities peer to those of the IAB node A, and may further include an IAB RLC channel $B_1$, . . . , and an IAB RLC channel Bk that are in a one-to-one correspondence with RLC entities peer to those of the IAB node B, where both n and k are positive integers. The IAB node C performs RLC-layer transmit side processing on a data packet on each IAB RLC channel at the RLC layer, to obtain an RLC PDU. Optionally, the IAB node C performs a segmentation operation on an RLC SDU at the RLC layer, and transmits the RLC PDU to the MAC layer through the IAB LCH. The IAB node C performs, at the MAC layer, MAC-layer operation processing such as multiplexing oriented to the node A or the node B, and sends data through the IAB transport channel. It should be understood that an adaptation layer in a protocol stack shown in FIG. 4 is located above an RLC layer, and an RLC channel is in a one-to-one correspondence with an LCH.

Figure 5:
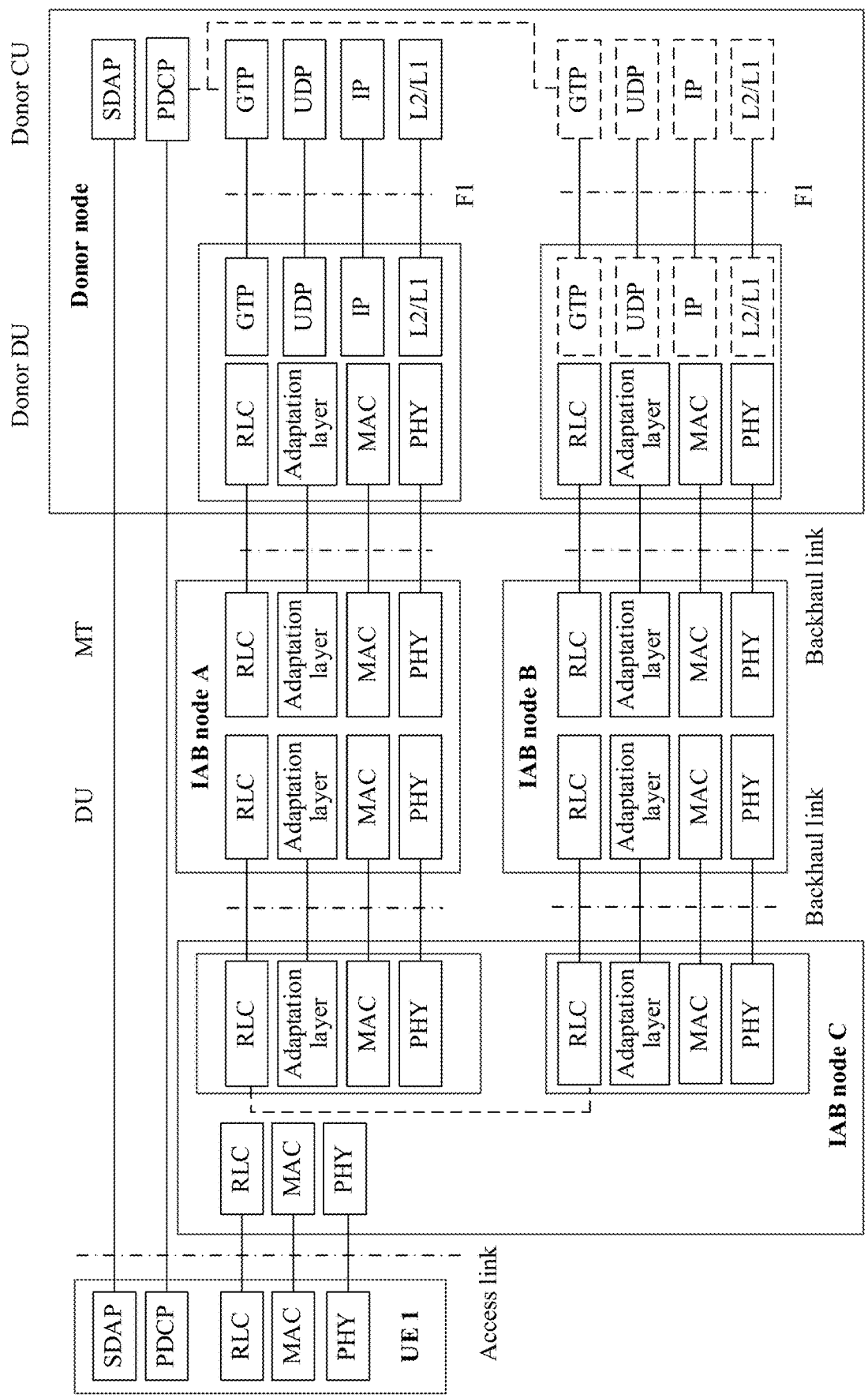
FIG. 5 shows another user plane protocol stack architecture according to an embodiment of the application.

FIG. 5 shows another user plane protocol stack architecture according to an embodiment of the application. In protocol layers on a backhaul link shown in FIG. 5, the IAB node and the donor node each include an RLC layer, an adaptation layer, a MAC layer, and a PHY layer successively from top to bottom. That is, the adaptation layer is located between the RLC layer and the MAC layer. Other parts in the protocol stack architecture are similar to those in FIG. 3, and details are not described herein again.

Based on a protocol stack shown in FIG. 5, in the communications system shown in FIG. 1, the IAB node C is used as an example. The IAB node C has the two next-hop nodes on the uplink, that is, the IAB node A and the IAB node B. Therefore, uplink data of the IAB node C can be transmitted through both the IAB node A and the IAB node B. For such a protocol stack, a granularity of the adaptation layer of the IAB node may also include a plurality of possibilities, which is similar to the protocol stack architecture shown in FIG. 3. Details are not described herein again.

Based on different scenarios such as whether a buffer is set at the adaptation layer and a quantity of preconfigured thresholds, the embodiments of the application may be classified into the following possible cases:

1. No buffer is set at the adaptation layer, and no threshold (the threshold refers in particular to a threshold used by the IAB node C to determine a reporting node) is configured.

Before performing processing (for example, routing and QoS mapping decision-making) at the adaptation layer, the IAB node C places an uplink data packet in a buffer of an RLC entity corresponding to an IAB RLC channel, and an uplink IAB RLC channel at the IAB node C is in a one-to-one correspondence with a UE bearer. In this case, because an offloading decision for the uplink data packet is made by the IAB node C, when the IAB node C collects statistics about an uplink data volume, the IAB node C may collect statistics about a volume of data in the buffer of the RLC layer entity in advance, and the IAB node C determines a data volume to be reported to each parent node.

2. No buffer is set at the adaptation layer, and a threshold (TH) is preconfigured.

No buffer is set at the adaptation layer of the IAB node C, the threshold TH is configured, and TH is greater than or equal to 0. Uplink data packets of the IAB node C are located in the buffer at the RLC layer, and the uplink data packets may include three types of data packets, that is, the first-type data packet, the second-type data packet, and the third-type data packet in the foregoing method 200. The data volume of the first-type data packet is $V_C$, the data volume of the second-type data packet is $V_A$, and the data volume of the third-type data packet is $V_B$. In Case 2, the first-type data packet, the second-type data packet, and the third-type data packet are all data packets at the RLC layer.

It should be understood that, the data packets in the buffer at the RLC layer of the IAB node C may be to-be-sent data packets located at the RLC layer of the IAB node C, and data volumes of the to-be-sent data packets included in the buffer at the RLC layer of the IAB node C may include a total data volume of RLC SDUs and RLC PDUs that are to be sent by the IAB node C. These to-be-sent data packets (RLC SDUs and/or RLC PDUs) may include an RLC SDU and an RLC SDU segment that have not been encapsulated into an RLC PDU, an RLC PDU to be transmitted for the first time, an RLC PDU to be retransmitted, and the like. This is not limited in the embodiments of the application.

When $V_A+V_B+V_C \geq TH$, the IAB node C reports the data volume of $V_C$ to both the two parent nodes: the IAB node A and the IAB node B; otherwise, the IAB node C reports the data volume of $V_C$ only to a specified parent node (the IAB node A or the IAB node B).

In another possible implementation, optionally, $V_{Aj}$ indicates a data volume of a data packet that is in the to-be-sent data packets located in the buffer at the RLC layer of the IAB node C and that can be sent to the parent node A only through a logical channel j; $V_{Bk}$ indicates a data volume of a data packet that is in the to-be-sent data packets located in the buffer at the RLC layer of the IAB node C and that can be sent to the node B only through a logical channel k; and $V_C$ indicates a data volume of a data packet that is in the to-be-sent data packets located in the buffer at the RLC layer of the IAB node C and that can not only be sent to A through the logical channel j but also can be sent to B through the logical channel k.

When $V_{Aj}+V_{Bk}+V_C \geq TH$, the IAB node C reports the data volume of $V_C$ to both the two parent nodes: the IAB node A and the IAB node B; otherwise, the IAB node C reports the data volume of $V_C$ only to a specified parent node (the IAB node A or the IAB node B).

Figure 6:
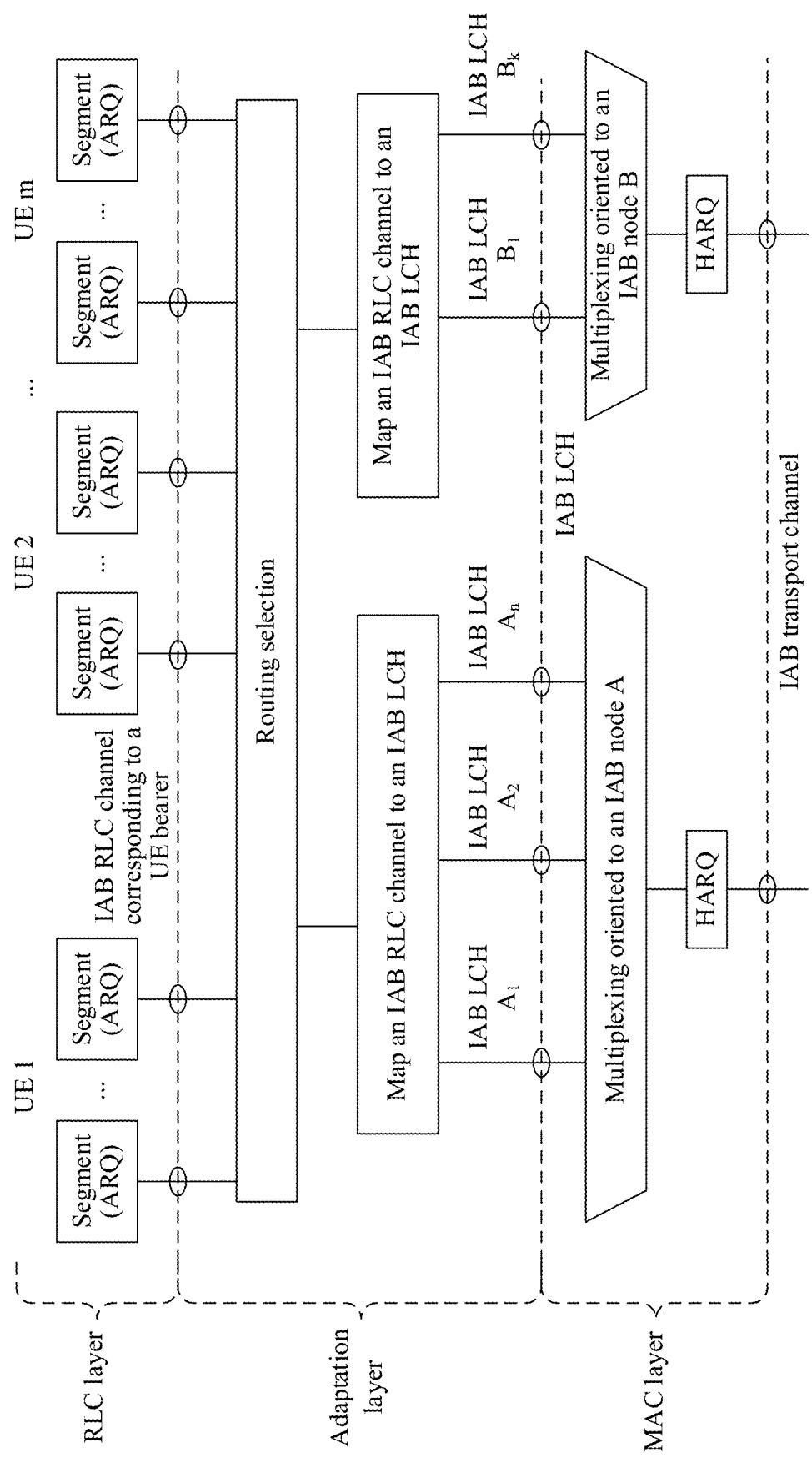
FIG. 6 is a schematic diagram of another layer 2 architecture when a wireless backhaul node serves as a transmit side according to an embodiment of the application.

It should be understood that the IAB node C may have some services of the IAB node C, that is, there is uplink service transmission initiated by the IAB node C or a downlink service terminated at the IAB node C, and data or signaling transmission is also involved. In the embodiments of the application, the service of the IAB node C may be processed at the adaptation layer, or may not be processed at the adaptation layer. This is not limited in the embodiments of the application Corresponding to the protocol stack architecture shown in FIG. 5, FIG. 6 and FIG. 7 each are a schematic diagram of a layer 2 architecture when the wireless backhaul node shown in FIG. 5 serves as a transmit side. The IAB node C in an embodiment is used as an example. The IAB node C may receive data packets from a plurality of UEs, for example, UE 1, UE 2, ..., and UE m, where m is a positive integer. The IAB node C may first perform RLC-layer transmit side processing on a data packet of each UE at the RLC layer, to obtain an RLC PDU, and transmit the RLC PDU to the adaptation layer through an IAB RLC channel. Optionally, the IAB node C performs a segmentation operation on an RLC SDU or an RLC SDU segment at the RLC layer. The IAB node C may perform routing selection at the adaptation layer, and a result of the routing selection may be selecting the IAB node A as a next-hop node, or selecting the IAB node B as a next-hop node. The IAB node C may further perform QoS mapping at the adaptation layer, to map an IAB RLC channel to an IAB LCH channel. It should be understood that, a channel between the RLC layer and the adaptation layer may be referred to as an IAB RLC channel (or an RLC channel of a backhaul link); a channel between the adaptation layer and the MAC layer may be referred to as an IAB LCH (or an LCH of the backhaul link); and a channel between the MAC layer and the PHY layer may be referred to as an IAB transport channel (or a transport channel of the backhaul link). As shown in FIG. 6, an RLC channel of the IAB node C is in a one-to-one correspondence with a UE radio bearer, and logical channels of the IAB node C include an IAB LCH $A_1$, . . . , and an IAB LCH $A_n$ corresponding to the IAB node A, and may further include an IAB LCH $B_1$, and an IAB LCH Bk corresponding to the IAB node B, where both n and k are positive integers. The IAB node C transmits the RLC PDU to the MAC layer through the IAB LCH. The IAB node C performs, at the MAC layer, MAC-layer operation processing such as multiplexing oriented to the node A or the node B, and sends data through the IAB transport channel. It should be understood that the adaptation layer in the protocol stack shown in FIG. 4 is located between the RLC layer and the MAC layer. After mapping at the adaptation layer, one RLC channel may correspond to a plurality of LCHs.

As shown in FIG. 6, for service-related data or signaling transmission of the IAB node C, same as that when the IAB node C serves as a backhaul node, processing at the adaptation layer needs to be performed between the MAC layer and the RLC layer, and then data is delivered to the MAC layer (if the IAB node C serves as a transmit side) or an RLC layer (if the IAB node C serves as a receive side) for processing.

Figure 7:
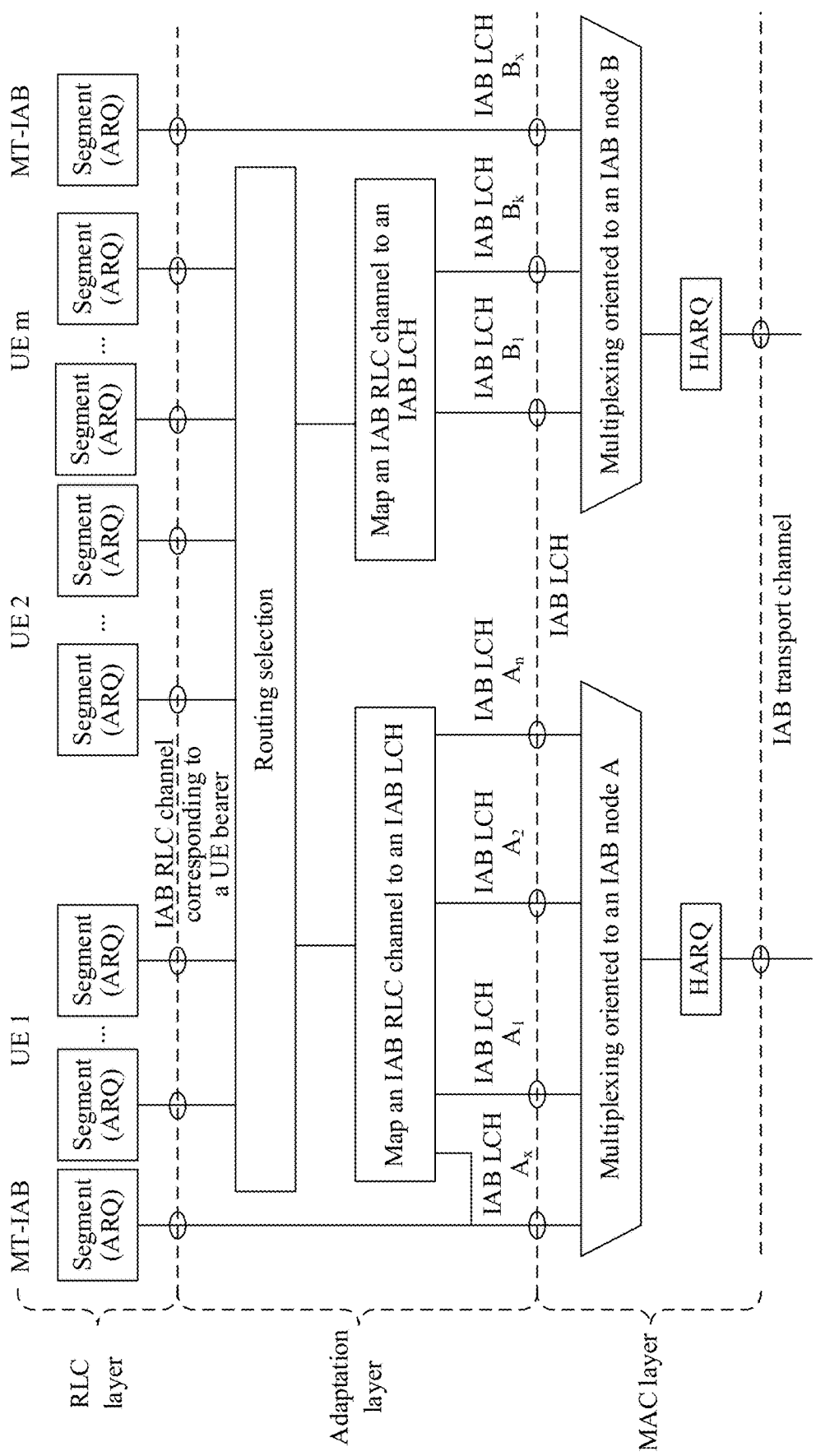
FIG. 7 is a schematic diagram of still another layer 2 architecture when a wireless backhaul node serves as a transmit side according to an embodiment of the application.

As shown in FIG. 7, the service of the IAB node C does not need to be processed at the adaptation layer between the MAC layer and the RLC layer. If the IAB node C serves as a transmit side, a data packet related to the service of the IAB node C may be directly delivered to the MAC layer for processing after being processed at the RLC layer. If the IAB node serves as a receive side, the data packet related to the service of the IAB node C may be directly delivered to the RLC layer for processing after being processed at the MAC layer.

In FIG. 7, RLC entities corresponding to data packets generated by the IAB node may be marked as MT-IAB, and these RLC entities are mapped to one logical channel one by one. The logical channel may be specially used to carry a service of the IAB node, or may be multiplexed by a service of the IAB node and a service of the UE, that is, when performing backhaul and access, the IAB node may multiplex a same logical channel (for example, an LCH Ax in FIG. 7).

3. No buffer is set at the adaptation layer, and two thresholds ($TH_A$ and $TH_B$) are preconfigured.

No buffer is set at the adaptation layer of the IAB node C, the thresholds $TH_A$ and $TH_B$ are configured, and both $TH_A$ and $TH_B$ are greater than or equal to 0. Uplink data packets of the IAB node C are located in the buffer at the RLC layer of the IAB node C, and the uplink data packets may include three types of data packets, that is, the first-type data packet, the second-type data packet, and the third-type data packet in the foregoing method 200. The data volume of the first-type data packet is $V_C$, the data volume of the second-type data packet is $V_A$, and the data volume of the third-type data packet is $V_B$. In Case 3, the first-type data packet, the second-type data packet, and the third-type data packet are all data packets at the RLC layer.

If $V_A+V_C<TH_A$ and $V_B+V_C\geq TH_B$, the IAB node C reports the data volume of $V_C$ to the IAB node A.

If $V_A+V_C>TH_A$ and $V_B+V_C<TH_B$, the IAB node C reports the data volume of $V_C$ to the IAB node B.

If $V_A+V_C<TH_A$ and $V_B+V_C<TH_B$, the IAB node C reports the data volume of $V_C$ to one of the IAB node A and the IAB node B.

If $V_A+V_C\geq TH_A$ and $V_B+V_C\geq TH_B$, the IAB node C reports the data volume of $V_C$ to both the IAB node A and the IAB node B.

In another possible implementation, optionally, $V_{Aj}$ indicates a data volume of a data packet that is in the to-be-sent data packets located in the buffer at the RLC layer of the IAB node C and that can be sent to the IAB node A only through a bearer j; $V_{Bk}$ indicates a data volume of a data packet that is in the to-be-sent data packets located in the buffer at the RLC layer of the IAB node C and that can be sent to the IAB node B only through a bearer k; and $V_C$ indicates a data volume of a data packet that is in the to-be-sent data packets located in the buffer at the RLC layer of the IAB node C and that can not only be sent to A through the bearer j but also can be sent to B through the bearer k.

If $V_{Aj}+V_C<TH_A$ and $V_{Bk}+V_C\geq TH_B$, the IAB node C reports the data volume of $V_C$ to the IAB node A.

If $V_{Aj}+V_C\geq TH_A$ and $V_{Bk}+V_C<TH_B$, the IAB node C reports the data volume of $V_C$ to the IAB node B.

If $V_{Aj}+V_C<TH_A$ and $V_{Bk}+V_C<TH_B$, the IAB node C reports the data volume of $V_C$ to one of the IAB node A and the IAB node B.

If $V_{Aj}+V_C\geq TH_A$ and $V_{Bk}+V_C\geq TH_B$, the IAB node C reports the data volume of $V_C$ to both the IAB node A and the IAB node B.

4. A buffer is set at the adaptation layer, and a threshold (TH) is preconfigured.

The buffer is set at the adaptation layer of the IAB node C, the threshold TH is configured, and TH is greater than or equal to 0. Uplink data packets of the IAB node C are located in the buffer at the adaptation layer of the IAB node C and the buffer at the RLC layer of the IAB node C, and the uplink data packets may include three types of data packets, that is, the first-type data packet, the second-type data packet, and the third-type data packet in the foregoing method 200. The data volume of the first-type data packet is $V_C$, the data volume of the second-type data packet is $V_A$, and the data volume of the third-type data packet is $V_B$. Herein, the first-type data packet, the second-type data packet, and the third-type data packet include both the data packet at the adaptation layer and the data packet at the RLC layer.

When $V_A+V_B+V_C\geq TH$, the IAB node C reports the data volume of $V_C$ to both the two parent nodes: the IAB node A and the IAB node B; otherwise, the IAB node C reports the data volume of $V_C$ only to a specified parent node (the IAB node A or the IAB node B).

In another possible implementation, optionally, $V_{Aj}$ indicates a data volume of a data packet that is in the to-be-sent data packets located in the buffer at the adaptation layer of the IAB node C and the buffer at the RLC layer of the IAB node C and that can be sent to the IAB node A only through a bearer j; $V_{Bk}$ indicates a data volume of a data packet that is in the to-be-sent data packets located in the buffer at the adaptation layer of the IAB node C and the buffer at the RLC layer of the IAB node C and that can be sent to the IAB node B only through a bearer k; and $V_C$ indicates a data volume of a data packet that is in the to-be-sent data packets located in the buffer at the adaptation layer of the IAB node C and the buffer at the RLC layer of the IAB node C and that can not only be sent to A through the bearer j but also can be sent to B through the bearer k.

When $V_{Aj}+V_{Bk}+V_C\geq TH$, the IAB node C reports the data volume of $V_C$ to both the two parent nodes: the IAB node A and the IAB node B; otherwise, the IAB node C reports the data volume of $V_C$ only to a specified parent node (the IAB node A or the IAB node B).

5. A buffer is set at the adaptation layer, and two thresholds ($TH_A$ and $TH_B$) are preconfigured.

The buffer is set at the adaptation layer of the IAB node C, the thresholds $TH_A$ and $TH_B$ are configured, and both $TH_A$ and $TH_B$ are greater than or equal to 0. Uplink data packets of the IAB node C are located in the buffer at the adaptation layer of the IAB node C and the buffer at the RLC layer of the IAB node C, and the uplink data packets may include three types of data packets, that is, the first-type data packet, the second-type data packet, and the third-type data packet in the foregoing method 200. The data volume of the first-type data packet is $V_C$, the data volume of the second-type data packet is $V_A$, and the data volume of the third-type data packet is $V_B$. Herein, the first-type data packet, the second-type data packet, and the third-type data packet include both the data packet at the adaptation layer and the data packet at the RLC layer.

If $V_A+V_C<TH_A$ and $V_B+V_C \geq TH_B$, the IAB node C reports the data volume of $V_C$ to the IAB node A.

If $V_A+V_C \geq TH_A$ and $V_B+V_C<TH_B$, the IAB node C reports the data volume of $V_C$ to the IAB node B.

If $V_A+V_C<TH_A$ and $V_BB+C<TH_B$, the IAB node C reports the data volume of C to one of the IAB node A and the IAB node B.

If $A+C>TH_A$ and $B+C>TH_B$, the IAB node C reports the data volume of C to both the IAB node A and the IAB node B.

In another possible implementation, optionally, $A_j$ indicates a data volume of a data packet that is in the to-be-sent data packets located in the buffer at the adaptation layer of the IAB node C and the buffer at the RLC layer of the IAB node C and that can be sent to the IAB node A only through a bearer j; Bk indicates a data volume of a data packet that is in the to-be-sent data packets located in the buffer at the adaptation layer of the IAB node C and the buffer at the RLC layer of the IAB node C and that can be sent to the IAB node B only through a bearer k; and $V_C$ indicates a data volume of a data packet that is in the to-be-sent data packets located in the buffer at the adaptation layer of the IAB node C and the buffer at the RLC layer of the IAB node C and that can not only be sent to A through the bearer j but also can be sent to B through the bearer k.

If $V_{Aj}+V_C<TH_A$ and $V_{Bk}+V_C \geq TH_B$, the IAB node C reports the data volume of $V_C$ to the IAB node A.

If $V_{Aj}+V_C \geq TH_A$ and $V_{Bk}+V_C<TH_B$, the IAB node C reports the data volume of $V_C$ to the IAB node B.

If $V_{Aj}+V_C<TH_A$ and $V_{Bk}+V_C<TH_B$, the IAB node C reports the data volume of $V_C$ to one of the IAB node A and the IAB node B.

If $V_{Aj}+V_C \geq TH_A$ and $V_{Bk}+V_C \geq TH_B$, the IAB node C reports the data volume of $V_C$ to both the IAB node A and the IAB node B.

In the foregoing embodiments, the data packet in the buffer at the adaptation layer of the IAB node C may be a to-be-sent data packet located at the adaptation layer of the IAB node C, and includes any one or more of the following: an SDU at the adaptation layer, a PDU that is at the adaptation layer and that has not been delivered to a lower protocol layer, a status report at the adaptation layer, a PDU that is at the adaptation layer and that is to be retransmitted, and the like. This is not limited in the embodiments of the application. The data packet in the buffer at the RLC layer of the IAB node C may be a to-be-sent data packet (including a to-be-sent RLC SDU and a to-be-sent RLC PDU) located at the RLC layer of the IAB node C, and includes any one or more of the following: an RLC SDU and an RLC SDU segment that have not been encapsulated into an RLC PDU, an RLC PDU to be transmitted for the first time, an RLC PDU to be retransmitted, and the like. This is not limited in the embodiments of the application.

It should be understood that, the data packet of the data volume of $V_C$ may further include data of a PDCP layer entity of the IAB node C. Further, the PDCP entity may be a PDCP entity corresponding to the bearer j and the bearer k when the IAB node C serves as a mobile terminal MT.

It should be further understood that, to some extent, the threshold $TH_A$ and the threshold $TH_B$ respectively reflect transmission capabilities of uplink links from the IAB node C to the two parent nodes: the IAB node A and the IAB node B.

In the embodiments of the application, a threshold for determining reporting by the IAB node C and a specified parent node when a common part, namely, the data volume $V_C$ is reported to only one node may be configured by the donor node (the CU of the donor node or the CU-CP part of the donor node) for the IAB node C. In one embodiment, the donor node may configure the foregoing information for the IAB node C by using an F1 application protocol (F1AP) message or a radio resource control (RRC) message.

According to the data transmission method used in a wireless backhaul network in the embodiments of the application, the wireless backhaul node selects, for a data packet that can be flexibly routed, a reporting node from the plurality of next-hop nodes of the wireless backhaul node on the uplink based on data volumes of different types of data packets, and sends, to the reporting node, a buffer status report used to indicate a data volume of such a data packet that can be flexibly routed, so that such a data packet can be transmitted through the reporting node, thereby performing uplink offloading by properly using a plurality of links. This helps improve uplink data transmission efficiency.

Based on the foregoing embodiments, the application further provides another data transmission method used in a wireless backhaul network. The following describes in detail the data transmission method used in a wireless backhaul network in the application by using an example in which a terminal device is UE 1, a wireless backhaul node is an IAB node C, and the IAB node C has N next-hop nodes (parent nodes) on an uplink.

The IAB node C has the N parent nodes, N is an integer greater than or equal to 2, and the N parent nodes i=1, 2, . . . , N are identified by using a subscript i in the embodiments of the application. For the IAB node C, a data volume that is of a data packet and that can be reported only to the parent node i is $V_i$, and $V_i$ may be greater than or equal to 0; and a data volume of a data packet that can be flexibly routed is $V_C$, and the data packet that can be flexibly routed may be transmitted through any one of the N parent nodes. In this case, the IAB node C may determine, in the following plurality of manners, one or more reporting nodes for the data volume $V_C$ of the data packet that can be flexibly routed.

1. A threshold TH is configured for the IAB node C, and the threshold may be sent by a donor node (or a CU, or a CU-CP) to the IAB node C.

If $V_C+\Sigma_{i=1}^{N} V_i \geq TH$, the IAB node C may report the data volume of $V_C$ to all of the N parent nodes. A reporting manner may be that the IAB node C reports the data volume of $V_C$ to each of the N parent nodes, or the IAB node C may determine to report a proportion of the data volume of $V_C$ to each of the N parent nodes. The proportions of the data volume reported by the IAB node C to all of the N parent nodes may be the same or may be different, and a value of the proportion is greater than 0 and less than or equal to 1.

Otherwise, if $V_C+\Sigma_{i=1}^{N}V_i<TH$, the IAB node C may report the data volume of $V_C$ only to a specified parent node in the N parent nodes, and the parent node may be an agreed specified node (for example, specified by the donor node, the CU, or the CU-CP), or may be selected by the IAB node C.

2. N−1 thresholds $TH'_j$ are set for IAB node C, where a subscript j is an identifier of the threshold, j=1, 2, . . . , N−1, larger j indicates a larger threshold $TH'_j$, and these thresholds may be sent by the donor node (or the CU, or the CU-CP) to the IAB node C.

If $V_C<TH'_1$, the IAB node C may report the data volume of $V_C$ to a specified parent node in the N parent nodes, and the parent node may be an agreed specified node (for example, specified by the donor node, the CU, or the CU-CP), or may be selected by the IAB node C.

If $TH'_j<V_C<TH'_{j+1}$ (j=1, 2, . . . , N−2), the IAB node C may report the data volume of $V_C$ to j+1 parent nodes in the N parent nodes, and the j+1 parent nodes may be agreed specified nodes (for example, specified by the donor node, the CU, or the CU-CP), or may be selected by the IAB node C. A reporting manner may be that the IAB node C reports the data volume of $V_C$ to each of the j+1 parent nodes, or the IAB node C may determine to report a proportion of the data volume of $V_C$ to each of the j+1 parent nodes. The proportions of the data volume reported by the IAB node C to all of the j+1 parent nodes may be the same or may be different, and a value of the proportion is greater than 0 and less than or equal to 1.

If $V_C \geq TH'_{N-1}$, the IAB node C may report the data volume of $V_C$ to all of the N parent nodes. A reporting manner may be that the IAB node C reports the data volume of $V_C$ to each of the N parent nodes, or the IAB node C may determine to report a proportion of the data volume of $V_C$ to each of the N parent nodes. The proportions of the data volume reported by the IAB node C to all of the N parent nodes may be the same or may be different, and a value of the proportion is greater than 0 and less than or equal to 1.

3. N−1 thresholds $TH_j$ are set for the IAB node C, where a subscript j is an identifier of the threshold j=1, 2, . . . , N−1 larger j indicates a larger threshold $TH_j$, and these thresholds may be sent by the donor node (or the CU, or the CU-CP) to the IAB node C.

If $V_C+\Sigma_{i=1}^{N}V_i<TH_1$, the IAB node C may report the data volume of $V_C$ to a specified parent node in the N parent nodes, and the parent node may be an agreed specified node (for example, specified by the donor node, the CU, or the CU-CP), or may be selected by the IAB node C.

If $TH_j<V_C+\Sigma_{i=1}^{N}V_i<TH_{j+1}$ (j=1, 2, . . . , N−2), the IAB node C may report the data volume of $V_C$ to j+1 parent nodes in the N parent nodes, and the j+1 parent nodes may be the agreed specified nodes (for example, specified by the donor node, the CU, or the CU-CP), or may be selected by the IAB node C. A reporting manner may be that the IAB node C reports the data volume of $V_C$ to each of the j+1 parent nodes, or the IAB node C may determine to report a proportion of the data volume of $V_C$ to each of the j+1 parent nodes. The proportions of the data volume reported by the IAB node C to all of the j+1 parent nodes may be the same or may be different, and a value of the proportion is greater than 0 and less than or equal to 1.

If $V_C+\Sigma_{i=1}^{N}V_i \geq TH_{N-1}$, the IAB node C may report the data volume of $V_C$ to all of the N parent nodes. A reporting manner may be that the IAB node C reports the data volume of $V_C$ to each of the N parent nodes, or the IAB node C may determine to report a proportion of the data volume of $V_C$ to each of the N parent nodes. The proportions of the data volume reported by the IAB node C to all of the N parent nodes may be the same or may be different, and a value of the proportion is greater than 0 and less than or equal to 1.

4. N thresholds $TH_i$ are set for the IAB node C, where a subscript i is an identifier of the threshold and is also an identifier of the N parent nodes, and these thresholds may be sent by the donor node (or the CU, or the CU-CP) to the IAB node C.

If $V_C+V_i<TH$, the IAB node C may report the data volume of $V_C$ to the parent node i. Optionally, if there are M (1≤M≤N) parent nodes that meet the determining condition, that is, there are a plurality of values of i, the IAB node C may report the data volume of $V_C$ to any x (1≤x≤M) parent nodes in the M parent nodes that meet the determining condition. The x parent nodes may be agreed specified nodes (for example, specified by the donor node, the CU, or the CU-CP), or may be selected by the IAB node C. A reporting manner may be that the IAB node C reports the data volume of $V_C$ to each of the x parent nodes, or the IAB node C may determine to report a proportion of the data volume of $V_C$ to each of the x parent nodes. The proportions of the data volume reported by the IAB node C to all of the x parent nodes may be the same or may be different, and a value of the proportion is greater than 0 and less than or equal to 1.

If no i satisfies $V_C+V_i<TH_i$, that is, for any i, $V_C+V_i \geq TH_i$, the IAB node C may report the data volume of $V_C$ to all of the N parent nodes. A reporting manner may be that the IAB node C reports the data volume of $V_C$ to each of the N parent nodes, or the IAB node C may determine to report a proportion of the data volume of $V_C$ to each of the N parent nodes. The proportions of the data volume reported by the IAB node C to all of the N parent nodes may be the same or may be different, and a value of the proportion is greater than 0 and less than or equal to 1.

It should be understood that sequence numbers of the foregoing processes do not indicate an execution sequence. The execution sequence of the processes should be determined based on functions and internal logic of the processes, and should not be construed as any limitation on an implementation process of the embodiments of the application.

The data transmission method used in a wireless backhaul network according to the embodiments of the application is described in detail above with reference to FIG. 1 to FIG. 7, and a data transmission apparatus used in a wireless backhaul network according to embodiments of the application is described in detail below with reference to FIG. 8 and FIG. 9.

Figure 8:
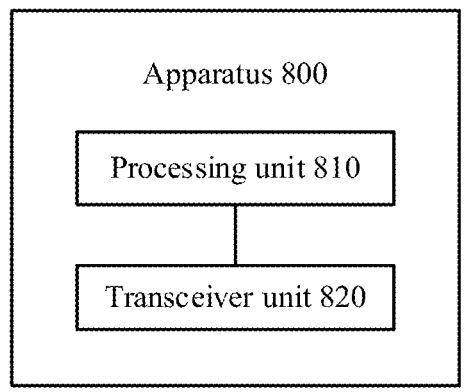
FIG. 8 is a schematic block diagram of a data transmission apparatus used in a wireless backhaul network according to an embodiment of the application.

FIG. 8 shows a data transmission apparatus 800 used in a wireless backhaul network according to an embodiment of the application. The apparatus 800 may be a wireless backhaul node, or may be a chip in a wireless backhaul node. The apparatus 800 has a plurality of next-hop nodes on an uplink, and the apparatus 800 includes a processing unit 810 and a transceiver unit 820.

The processing unit 810 is configured to determine one or more reporting nodes for a data volume of a first-type data packet from the plurality of next-hop nodes based on the data volume of the first-type data packet, a data volume of a second-type data packet, and a data volume of a third-type data packet. The transceiver unit 820 is configured to send a buffer status report to the one or more reporting nodes, where the buffer status report is used to indicate the data volume of the first-type data packet. At least one of the first-type data packet, the second-type data packet, and the third-type data packet includes a data packet from an adaptation layer entity of the data transmission apparatus and/or a data packet from a radio link control layer entity of the data transmission apparatus; the first-type data packet can be transmitted through a first next-hop node in the plurality of next-hop nodes and a second next-hop node in the plurality of next-hop nodes; the second-type data packet can be transmitted only through the first next-hop node in the plurality of next-hop nodes; and the third-type data packet can be transmitted only through the second next-hop node in the plurality of next-hop nodes.

According to the data transmission apparatus used in a wireless backhaul network in an embodiment of the application, the wireless backhaul node selects, for a data packet that can be flexibly routed, a reporting node from the plurality of next-hop nodes of the wireless backhaul node on the uplink based on data volumes of different types of data packets, and sends, to the reporting node, a buffer status report used to indicate a data volume of such a data packet that can be flexibly routed, so that such a data packet can be transmitted through the reporting node, thereby performing uplink offloading by properly using a plurality of links. This helps improve uplink data transmission efficiency.

Optionally, when a sum of the data volume of the first-type data packet, the data volume of the second-type data packet, and the data volume of the third-type data packet is greater than or equal to a first threshold, the one or more reporting nodes are the first next-hop node and the second next-hop node.

Optionally, when the sum of the data volume of the first-type data packet, the data volume of the second-type data packet, and the data volume of the third-type data packet is less than a second threshold, the one or more reporting nodes are one of the first next-hop node and the second next-hop node.

Optionally, when a sum of the data volume of the first-type data packet and the data volume of the second-type data packet is less than a third threshold, and a sum of the data volume of the first-type data packet and the data volume of the third-type data packet is greater than or equal to a fourth threshold, the one or more reporting nodes are the first next-hop node.

Optionally, when the sum of the data volume of the first-type data packet and the data volume of the second-type data packet is greater than or equal to a fifth threshold, and the sum of the data volume of the first-type data packet and the data volume of the third-type data packet is less than a sixth threshold, the one or more reporting nodes are the second next-hop node.

Optionally, when the sum of the data volume of the first-type data packet and the data volume of the second-type data packet is less than a seventh threshold, and the sum of the data volume of the first-type data packet and the data volume of the third-type data packet is less than an eighth threshold, the one or more reporting nodes are one of the first next-hop node and the second next-hop node.

Optionally, when the sum of the data volume of the first-type data packet and the data volume of the second-type data packet is greater than or equal to a ninth threshold, and the sum of the data volume of the first-type data packet and the data volume of the third-type data packet is greater than or equal to a tenth threshold, the one or more reporting nodes are the first next-hop node and the second next-hop node.

Optionally, at least one of the first-type data packet, the second-type data packet, and the third-type data packet further includes a data packet from a packet data convergence protocol layer entity of the data transmission apparatus.

Optionally, an adaptation layer of the data transmission apparatus is located between a radio link control layer of the data transmission apparatus and a media access control layer of the data transmission apparatus. The transceiver unit 820 is further configured to send at least one of the first-type data packet, the second-type data packet, or the third-type data packet to the first next-hop node and/or the second next-hop node in a first routing mode or a second routing mode in a hop-by-hop automatic repeat request mode or a hop-by-hop reassembly mode. In the first routing mode, different data packets from a same radio link control layer entity need to be routed to a same next-hop node in the plurality of next-hop nodes; and in the second routing mode, different data packets from a same radio link control layer entity can be routed to different next-hop nodes in the plurality of next-hop nodes, but different segments of a same data packet need to be routed to a same next-hop node in the plurality of next-hop nodes.

It should be understood that, the apparatus 800 herein is presented in a form of functional units. The term "unit" herein may be an application-specific integrated circuit (ASIC), an electronic circuit, a processor (for example, a shared processor, a dedicated processor, or a group processor) configured to execute one or more software or firmware programs and a memory, a merged logic circuit, and/or another proper component that supports the described functions. In an optional example, one of ordinary skill in the art may understand that the apparatus 800 may be the wireless backhaul node in the foregoing embodiments, and the apparatus 800 may be configured to perform procedures and/or operations corresponding to the wireless backhaul node in the foregoing method embodiments. To avoid repetition, details are not described herein again.

The apparatus 800 in the foregoing solutions has a function of implementing a corresponding operation performed by the wireless backhaul node in the foregoing method. The function may be implemented by hardware, or may be implemented by hardware by executing corresponding software. The hardware or the software includes one or more modules corresponding to the foregoing function. For example, a sending unit may be replaced with a transmitter, a receiving unit may be replaced with a receiver, and another unit such as a determining unit may be replaced with a processor, to respectively perform a sending operation, a receiving operation, and a related processing operation in the method embodiments.

In an embodiment of the application, the apparatus in FIG. 8 may alternatively be a chip or a chip system, for example, a system on chip (SoC). Correspondingly, the receiving unit and the sending unit may be a transceiver circuit of the chip. This is not limited herein.

Figure 9:
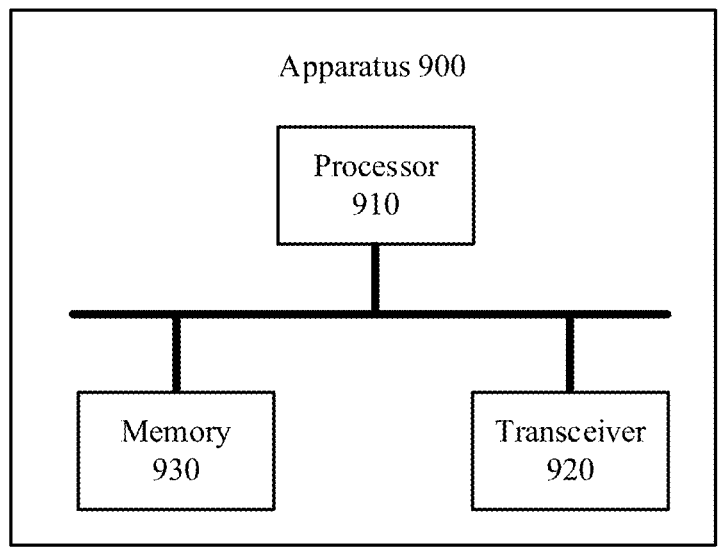
FIG. 9 is a schematic block diagram of another data transmission apparatus used in a wireless backhaul network according to an embodiment of the application.

FIG. 9 shows another data transmission apparatus 900 used in a wireless backhaul network according to an embodiment of the application. The apparatus 900 includes a processor 910, a transceiver 920, and a memory 930. The processor 910, the transceiver 920, and the memory 930 communicate with each other through an internal connection path. The memory 930 is configured to store an instruction. The processor 910 is configured to execute the instruction stored in the memory 930, to control the transceiver 920 to send a signal and/or receive a signal.

The processor 910 is configured to determine one or more reporting nodes for a data volume of a first-type data packet from the plurality of next-hop nodes based on the data volume of the first-type data packet, a data volume of a second-type data packet, and a data volume of a third-type data packet. The transceiver 920 is configured to send a buffer status report to the one or more reporting nodes, where the buffer status report is used to indicate the data volume of the first-type data packet. At least one of the first-type data packet, the second-type data packet, and the third-type data packet includes a data packet from an adaptation layer entity of the data transmission apparatus and/or a data packet from a radio link control layer entity of the data transmission apparatus; the first-type data packet can be transmitted through a first next-hop node in the plurality of next-hop nodes and a second next-hop node in the plurality of next-hop nodes; the second-type data packet can be transmitted only through the first next-hop node in the plurality of next-hop nodes; and the third-type data packet can be transmitted only through the second next-hop node in the plurality of next-hop nodes.

It should be understood that the apparatus 900 may be the wireless backhaul node in the foregoing embodiments, and may be configured to perform operations and/or procedures corresponding to the wireless backhaul node in the foregoing method embodiments. Optionally, the memory 930 includes a read-only memory and a random access memory, and provides an instruction and data for the processor. A part of the memory may further include a nonvolatile random access memory. For example, the memory may further store information about a device type. The processor 910 may be configured to execute the instruction stored in the memory; and when the processor 910 executes the instruction stored in the memory, the processor 910 is configured to perform operations and/or procedures corresponding to the wireless backhaul node in the foregoing method embodiments.

It should be understood that in an embodiment of the application, the processor of the foregoing apparatus may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

In an implementation process, the operations of the foregoing method can be implemented by using a hardware integrated logic circuit in the processor or by using an instruction in a form of software. The operations of the methods disclosed with reference to the embodiments of the application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor executes the instruction in the memory and completes the operations of the foregoing method in combination with the hardware of the processor. To avoid repetition, details are not described herein again.

In the application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally represents an "or" relationship between the associated objects. "At least one of the following" or a similar expression thereof indicates any combination of the following, and includes any combination of one or more of the following. For example, at least one of a, b, or c may indicate a, b, c, a and b, a and c, b and c, or a, b, and c, where a, b, and c may be singular or plural.

One of ordinary skill in the art may be aware that, the method operations and the units described in the embodiments disclosed in this specification can be implemented by electronic hardware, computer software, or a combination thereof. To clearly describe interchangeability between the hardware and the software, the foregoing has generally described operations and compositions of each embodiment based on functions. Whether the functions are performed by hardware or software depends on particular applications and design constraints of the technical solutions. One of ordinary skill in the art may use different methods to implement the described functions for each particular application, but it should not be considered that the implementation goes beyond the scope of the application.

One of ordinary skill in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in the application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or the communication connections between the apparatuses or the units may be implemented in an electrical form, a mechanical form, or another form.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions in the embodiments of the application.

In addition, functional units in the embodiments of the application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions in the application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the operations of the methods described in the embodiments of the application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely embodiments of the application, but are not intended to limit the protection scope of the application. Any modification or replacement readily figured out by one of ordinary skill in the art within the technical scope disclosed in the application shall fall within the protection scope of the application. Therefore, the protection scope of the application shall be subject to the protection scope of the claims.

What is claimed is:

1. A data transmission method used in a wireless backhaul network, wherein the wireless backhaul network comprises a wireless backhaul node, and the wireless backhaul node has a plurality of next-hop nodes on an uplink; the method comprising:
    determining, by the wireless backhaul node, one or more reporting nodes for a data volume of a first-type data packet from the plurality of next-hop nodes based on the data volume of the first-type data packet, a data volume of a second-type data packet, and a data volume of a third-type data packet; and
    sending, by the wireless backhaul node, a buffer status report to the one or more reporting nodes, wherein the buffer status report is used to indicate the data volume of the first-type data packet, wherein
    at least one of the first-type data packet, the second-type data packet, and the third-type data packet comprises a data packet from an adaptation layer entity of the wireless backhaul node, a data packet from a radio link control layer entity of the wireless backhaul node or the data packet from the adaptation layer entity of the wireless backhaul node and the data packet from the radio link control layer entity of the wireless backhaul node; the first-type data packet can be transmitted through a first next-hop node in the plurality of next-hop nodes and a second next-hop node in the plurality of next-hop nodes; the second-type data packet can be transmitted only through the first next-hop node in the plurality of next-hop nodes; and the third-type data packet can be transmitted only through the second next-hop node in the plurality of next-hop nodes.

2. The method according to claim 1, wherein when a sum of the data volume of the first-type data packet, the data volume of the second-type data packet, and the data volume of the third-type data packet is greater than or equal to a first threshold, the one or more reporting nodes are the first next-hop node and the second next-hop node.

3. The method according to claim 1, wherein when a sum of the data volume of the first-type data packet, the data volume of the second-type data packet, and the data volume of the third-type data packet is less than a second threshold, the one or more reporting nodes are one of the first next-hop node and the second next-hop node.

4. The method according to claim 1, wherein when a sum of the data volume of the first-type data packet and the data volume of the second-type data packet is less than a third threshold, and the sum of the data volume of the first-type data packet and the data volume of the third-type data packet is greater than or equal to a fourth threshold, the one or more reporting nodes are the first next-hop node.

5. The method according to claim 1, wherein when a sum of the data volume of the first-type data packet and the data volume of the second-type data packet is greater than or equal to a fifth threshold, and the sum of the data volume of the first-type data packet and the data volume of the third-type data packet is less than a sixth threshold, the one or more reporting nodes are the second next-hop node.

6. The method according to claim 1, wherein when a sum of the data volume of the first-type data packet and the data volume of the second-type data packet is less than a seventh threshold, and the sum of the data volume of the first-type data packet and the data volume of the third-type data packet is less than an eighth threshold, the one or more reporting nodes are one of the first next-hop node and the second next-hop node.

7. The method according to claim 1, wherein when a sum of the data volume of the first-type data packet and the data volume of the second-type data packet is greater than or equal to a ninth threshold, and the sum of the data volume of the first-type data packet and the data volume of the third-type data packet is greater than or equal to a tenth threshold, the one or more reporting nodes are the first next-hop node and the second next-hop node.

8. The method according to claim 1, wherein at least one of the first-type data packet, the second-type data packet, and the third-type data packet further comprises a data packet from a packet data convergence protocol layer entity of the wireless backhaul node.

9. The method according to claim 1, wherein the adaptation layer of the wireless backhaul node is located between the radio link control layer of the wireless backhaul node and a media access control layer of the wireless backhaul node; and
    the method further comprising:
    sending, by the wireless backhaul node, at least one of the first-type data packet, the second-type data packet, or the third-type data packet to the first next-hop node, to the second next-hop node or to the first next-hop node and the second next-hop node in a first routing mode or a second routing mode in a hop-by-hop automatic repeat request mode or a hop-by-hop reassembly mode, wherein
    in the first routing mode, different data packets from a same radio link control layer entity need to be routed to a same next-hop node in the plurality of next-hop nodes; and in the second routing mode, different data packets from a same radio link control layer entity can be routed to different next-hop nodes in the plurality of next-hop nodes, but different segments of a same data packet need to be routed to a same next-hop node in the plurality of next-hop nodes.

10. A data transmission apparatus used in a wireless backhaul network, wherein the data transmission apparatus has a plurality of next-hop nodes on an uplink, the data transmission apparatus comprising:
    at least one processor and at least one memory coupled to the at least one processor, wherein the at least one processor is configured to:
    determine one or more reporting nodes for a data volume of a first-type data packet from the plurality of next-hop nodes based on the data volume of the first-type data packet, a data volume of a second-type data packet, and a data volume of a third-type data packet; and
    send a buffer status report to the one or more reporting nodes, wherein the buffer status report is used to indicate the data volume of the first-type data packet, wherein
    at least one of the first-type data packet, the second-type data packet, and the third-type data packet comprises a data packet from an adaptation layer entity of the data transmission apparatus, a data packet from a radio link control layer entity of the data transmission apparatus or the data packet from the adaptation layer entity of the data transmission apparatus and the data packet from the radio link control layer entity of the data transmission apparatus; the first-type data packet can be transmitted through a first next-hop node in the plurality of next-hop nodes and a second next-hop node in the plurality of next-hop nodes; the second-type data packet can be transmitted only through the first next-hop node in the plurality of next-hop nodes; and the third-type data packet can be transmitted only through the second next-hop node in the plurality of next-hop nodes.

11. The apparatus according to claim 10, wherein when a sum of the data volume of the first-type data packet, the data volume of the second-type data packet, and the data volume of the third-type data packet is greater than or equal to a first threshold, the one or more reporting nodes are the first next-hop node and the second next-hop node.

12. The apparatus according to claim 10, wherein when a sum of the data volume of the first-type data packet, the data volume of the second-type data packet, and the data volume of the third-type data packet is less than a second threshold, the one or more reporting nodes are one of the first next-hop node and the second next-hop node.

13. The apparatus according to claim 10, wherein when a sum of the data volume of the first-type data packet and the data volume of the second-type data packet is less than a third threshold, and the sum of the data volume of the first-type data packet and the data volume of the third-type data packet is greater than or equal to a fourth threshold, the one or more reporting nodes are the first next-hop node.

14. The apparatus according to claim 10, wherein when a sum of the data volume of the first-type data packet and the data volume of the second-type data packet is greater than or equal to a fifth threshold, and the sum of the data volume of the first-type data packet and the data volume of the third-type data packet is less than a sixth threshold, the one or more reporting nodes are the second next-hop node.

15. The apparatus according to claim 10, wherein when a sum of the data volume of the first-type data packet and the data volume of the second-type data packet is less than a seventh threshold, and the sum of the data volume of the first-type data packet and the data volume of the third-type data packet is less than an eighth threshold, the one or more reporting nodes are one of the first next-hop node and the second next-hop node.

16. The apparatus according to claim 10, wherein when a sum of the data volume of the first-type data packet and the data volume of the second-type data packet is greater than or equal to a ninth threshold, and the sum of the data volume of the first-type data packet and the data volume of the third-type data packet is greater than or equal to a tenth threshold, the one or more reporting nodes are the first next-hop node and the second next-hop node.

17. The apparatus according to claim 10, wherein at least one of the first-type data packet, the second-type data packet, and the third-type data packet further comprises a data packet from a packet data convergence protocol layer entity of the data transmission apparatus.

18. The apparatus according to claim 10, wherein the adaptation layer of the data transmission apparatus is located between the radio link control layer of the data transmission apparatus and a media access control layer of the data transmission apparatus; and the at least one processor is further configured to:
send at least one of the first-type data packet, the second-type data packet, or the third-type data packet to the first next-hop node, to the second next-hop node or the first next-hop node and the second next-hop node in a first routing mode or a second routing mode in a hop-by-hop automatic repeat request mode or a hop-by-hop reassembly mode, wherein
in the first routing mode, different data packets from a same radio link control layer entity need to be routed to a same next-hop node in the plurality of next-hop nodes; and in the second routing mode, different data packets from a same radio link control layer entity can be routed to different next-hop nodes in the plurality of next-hop nodes, but different segments of a same data packet need to be routed to a same next-hop node in the plurality of next-hop nodes.

* * * * *